United States Patent [19]

Wang et al.

[11] Patent Number: 5,019,968
[45] Date of Patent: May 28, 1991

[54] THREE-DIMENSIONAL VECTOR PROCESSOR

[76] Inventors: Yulan Wang, 475 E. Canon Green; Steven E. Butner, 6226 W. Moreland Pl., both of Goleta, Calif. 93117

[21] Appl. No.: 174,653

[22] Filed: Mar. 29, 1988

[51] Int. Cl.$^5$ .................. G06F 9/315; G06F 9/38; G06F 15/347; G06F 15/31
[52] U.S. Cl. .................. 364/200; 364/224.2; 364/229; 364/230; 364/230.3; 364/231.9; 364/232.21; 364/238; 364/258.6; 364/244.2; 364/247.4; 364/258; 364/513; 364/736; 340/825.85
[58] Field of Search .............. 364/200, 900, 513, 726, 364/736; 358/136; 340/825.85, 825.89

[56] References Cited

U.S. PATENT DOCUMENTS

| | | | |
|---|---|---|---|
| 4,316,245 | 2/1982 | Luu et al. | 364/200 |
| 4,541,046 | 9/1985 | Nagashima et al. | 364/200 |
| 4,601,006 | 7/1986 | Liu | 364/426 |
| 4,686,645 | 8/1987 | McCanny et al. | 364/757 |
| 4,694,434 | 9/1987 | Von Ramm et al. | 340/720 |
| 4,710,812 | 12/1987 | Murakini et al. | 358/136 |
| 4,755,931 | 7/1988 | Abe | 364/736 |
| 4,760,518 | 7/1988 | Potash et al. | 364/200 |
| 4,760,525 | 7/1988 | Webb | 364/200 |
| 4,760,545 | 7/1988 | Inagami et al. | 364/736 |
| 4,761,754 | 8/1988 | Kinoshita | 364/736 |
| 4,763,276 | 8/1988 | Perrerra et al. | 364/513 |
| 4,780,811 | 10/1988 | Aoyama et al. | 364/200 |
| 4,819,512 | 4/1989 | Deerfield et al. | 364/200 |
| 4,884,190 | 11/1989 | Ngai et al. | 364/200 |
| 4,888,583 | 12/1989 | Ligocki et al. | 340/729 |

OTHER PUBLICATIONS

Amin-Jahaveri, Masood and Orin, "A Systolic Architecture for Computation of the Manipulator Inertia Matrix," *Proc. of the IEEE Conf. on Robotics and Automation*, Raleigh, North Carolina, 1987.
Asada et al.; *Robot Analysis and Control*, John Wiley and Sons, New York, 1986.
Barhen et al., "Advances in Concurrent Computation for Autonomous Robots", *Proc. of the Robotics Research Conf.*, Scottsdale, Arizona, Aug. 18-21, 1986.
Brady et al., edited by *Robot Motion: Planning and Control*, The MIT Press, Cambridge, Mass., 1984.
Chen et al., "NYMPH: A multiprocessor for Manipulation Applications", *Proc. of the IEEE Conf. on Robotics and Automation*, San Francisco, CA, 1986.
Craig, John, *Introduction to Robotics, Mechanics, and Control*, Addison-Wesley, Reading, Mass., 1986.
Goldstein, Herbert, *Classical Mechanics*, Addison-Wesley, 2nd Ed., Reading, Mass., 1980.
Haviland, G. L. et al. "ACORDIC Arithmetic Processor Chip", *IEEE Trans. on Comp.*, Vol. c29, No. 2, pp. 68-79, February 1980.
Kanade, Takeo et al., "Real Time Control of CMU Direct-Drive Arm II Using Customized Inverse Dynamics," *Proc. of the IEEE Conf. on Robotics and Automation*, 1984.
Khosla, Pradeep et al., "Real-Time Implementation and Evaluation of Model-Based Controls on CMU DD Arm II," *Proc. of the IEEE Conf. on Robotics and Automation*, San Fran., CA, 1986a.
Khosla, Pradeep, "Real-Time Control and Identif. of Direct Drive Manipulators, Ph.D. dissertation, Carnegie Mellon U., Aug., 1986b.
Leahy, M. B. et al., "Real-Time Evaluation of Robotic Control Methods". *Proc. of the IEEE Conf. on Robotics and Automation*, St Louis, MO, 1985.
Leahy, M. B. et al., "The RAL Hierarchical Control System," *Proc. of the IEEE Conf. on Robotics and Automation*, San Fran., CA, 1986a.
Leahy, M. B. et al., "Efficient Dynamics for the PUMA-600," *Proc. of the IEEE Conf. on Robotics and Automation*, San Fran., CA, 1986b.
Lee C. S. G. et al., "Efficient Parallel Algo. for Robot Inverse Dynamics Compu.", Internal Report #TR-EE-86-5, Purdue Univ., Oct. 1986b.
Lee, C. S. G. et al., "A Maximum Pipelined CORDIC Arch. for Inverse Kinematic Position Comp." Internal Report #TR-EE-86-5, Purdue Univ., Oct. 1986b.
Leung, S. et al., "Real-Time DKS on a Single Chip, *IEEE Journal of Robotics and Automation*, Vol. RA-3, No. 4, August 1987.
Ling, Y. C., *Layered Multiprocessor Architecture Design in VLSI for Real Time Robotic Control*, Ph.d. dissert., Ohio State Univ., Dec. 1986.
Luh, J. Y. S. et al., "On-Line Computational Scheme for Mechanical Manip," *Trans. ASME, J. Dynam Syst. Meas. Ctl.*, Vol. 120, pp. 69-76, June 1980.
Mujtaba, S. et al., "HAL, A Work Station Based Intel. Robot ctl. Environment," *Proc. of Robots* 11/17th ISIR, Chicago, IL, 1987.
Siegel, David et al., "Computational Architecture for the UTAH/MIT Hand", *Proc. of the IEEE Conf. on Rob. and Autom.*, St. Louis, MO, 1985.
Volder, J. E., "The CORDIC Trig. Computing Technique," IRE Trans. Electron. Computing, Vol. EC-8, No. 3, pp. 330-334, Sep. 1959.

*Primary Examiner*—Terrell W. Fears
*Assistant Examiner*—George C. Pappas
*Attorney, Agent, or Firm*—Blakely Sokoloff Taylor & Zafman

[57] ABSTRACT

A robotics-control processor for performing real-time inverse kinematics and inverse dynamics calculations involving three-dimensional vectors. The processor employs a three-wide register and execution unit architecture, pipelined instructions, and register-to-register data processing to achieve rapid vector calculations. Broadcast buffers for exchanging operands between register files, and operand multiplexing at several levels within the processor allow program operation flexibility. In a preferred embodiment, the processor includes a CORDIC algorithm unit for rapid vector rotation and trigonometric function calculations.

14 Claims, 9 Drawing Sheets

AW - OPERAND RETURN ADDRESS
ARa - PORT a READ ADDRESS
ARb - PORT b READ ADDRESS
osb - CORDIC OUTPUT SELECTION
osa - BROADCAST BUFFER SELECTION

THREE-DIMENSIONAL VECTOR PROCESSOR

1. FIELD OF THE INVENTION

The present invention relates to a three-dimensional processor designed for performing various arithmetic operations involving three-dimensional vectors and scalar quantities, and in particular, to a processor for performing real-time inverse dynamics and kinematics calculations needed in robotics control.

2. BACKGROUND OF THE INVENTION

The basic hardware of a robotic system involves a manipulator, assorted sensors and actuators for monitoring and controlling the manipulator, and a control system for issuing commands to the robot manipulator. The control system is basically a computer which is dedicated to the control of the robot, and provides the interface between the user and the robot.

Once the hardware for a robot has been assembled, the next step is to program the control system to accept user commands and manage the actions of the manipulator accordingly. If the architecture of the control system is well matched to the structure control algorithms, fast processing of the algorithms is possible. Once the programming is complete, the user can enter high-level commands into the control system and the robot will perform the requested task.

Due to the many steps involved with controlling a robot—beginning from the high-level user input to the final torques output to the actuators—it is convenient to partition this problem into a hierarchy of subproblems. A reasonable partitioning would be task planning, trajectory planning, and trajectory servoing. This partitioning can be visualized as a control hierarchy with the task planner at the highest level.

The task planner accepts the high-level user commands and determines where the manipulator must go in order to accomplish the task. Generally, a set of critical positions/orientations is sufficient for this purpose. The task planner's output feeds the trajectory planner, which generates a continuous manipulator trajectory. This is the desired trajectory which the manipulator must follow in order to accomplish the task, and is specified by a sequence of desired manipulator positions, velocities and accelerations. These sequences feed the servo loop which generates the necessary actuator torques needed to move the manipulator accordingly. Since servoing is performed in a closed-loop manner and the manipulator responds in a real-time fashion, stringent speed constraints are placed on the update rate.

All three levels of this robot control hierarchy are still areas of intensive robotic research. Even though there exists commercial robots which have a task planner, a trajectory planner, and a servoing block, their strategies are quite simple minded and their capabilities are limited.

Trajectory servoing theory is the most developed of the three control levels. Many different advanced servoing methods have been proposed (Asada, Brady, Craig) which have good theoretical foundations. However, the actual implementation of these methods is very computationally intensive, particularly because of the stringent update rate the servoing loop must satisfy.

Advanced servoing techniques require information about the manipulator's kinematic and dynamic properties. Solving a manipulator's inverse kinematic and inverse dynamic equations are where most of the computational work lies. If the solution of these problems could be determined within the real-time update rate, more advanced servoing techniques are possible, and therefore more advanced robot capabilities can be implemented.

If the evaluation of the inverse kinematic and inverse dynamic equations could be performed in a fraction of the update rate, other real-time computations could be included which enhance the robot's capabilities further (i.e., automatic collision avoidance).

The inverse kinematic problem is the transformation from the Cartesian coordinate system to the joint coordinate system particular to the robot manipulator. In other words, the inverse kinematic transformation calculates the necessary joint angles to position and orient a manipulator's end-effector at a specified Cartesian location. The more general problem is to translate a continuous Cartesian space trajectory into a joint space trajectory.

The dynamic equations of a rigid body specify how the body moves under applied forces and torques. This motion can be quantified by translational positions, velocities and accelerations. A robot manipulator, which is a set of linked rigid bodies, moves under applied forces and torques according to a set of coupled dynamic equations. The inverse dynamic equations, consequently, calculate the necessary forces and torques for generating a desired motion. Therefore, by applying the desired position, velocity and acceleration of a manipulator to its inverse dynamic equations, the required forces and torques needed to produce this motion can be calculated.

Many academic institutions have developed robot control systems primarily for experimenting with advanced robot control methods. More computationally powerful yet flexible systems than commercially available had to be designed to meet the real-time requirements of these techniques. These designs use off-the-shelf general-purpose processing subsystems (i.e., single-board computers) as the basic building blocks. More customized hardware, which is tailored to optimize the parallel processing of robot control algorithms, is needed to increase the speed at which these algorithms can be evaluated. General-purpose processing subsystems are inadequate for this purpose because they cannot efficiently extract parallelism in robot kinematics and dynamics.

Rensselaer Polytechnic Institute has developed a system for real-time evaluation of control algorithms. This system is customized for controlling a single PUMA arm (Leahy 1985, 1986a, 1986b). A DEC VAX-11/750 serves as the system host-supporting program development and interfacing to the real-time system. The real-time processor is an LSI-11/23 equipped with an FPF-11 floating-point coprocessor. This processor drives the original PUMA-600 servo controllers. Using this configuration RPI has been able to evaluate the computed torque control method at a 14 msec update rate.

Carnegie-Mellon has also developed a computer system for experimenting with various control algorithms (Khosla 1986a). Their system includes a VAX 11/750 and a 68000 single board computer with a Marinco APB-3024 floating point coprocessor. TMS-320 controller boards provide the servoing capabilities, and a Multibus allows communication between processors. CMU has reported that with this arrangement the CMU DD-II (6 degrees-of-freedom) can be controlled with the computed-torque algorithm at a 2 msec update rate. Further customizing of the dynamics can reduce the update rate to just over 1 msec (Kanade, Khosla 1986b).

Oak Ridge Laboratories has developed a computer system tailored to general robotic problems (Barhen). Their system is based around a multiprocessor arranged in a hypercube architecture. A real-time operating system, ROSES, has been developed. It provides near-optimum scheduling and communication between the various nodes. This system has been programmed to solve a 6 degree-of-freedom parallel formulation of the New-Euler inverse dynamic equations, and has resulted in a 5.67 msec execution time.

A multiprocessor system has been designed and implemented as a joint project between UTAH and MIT (Siegle). This system has been tailored to meet the computational requirements necessary to control the UTAH/MIT hand. The architecture involves five 68000-based single-board computers communicating over the Multibus. Four of the boards are dedicated to individual finger control and the fifth board coordinates the overall motion of the hand. A VAX-11/750 host provides the user interface to the multiprocessor system.

Stanford has also built a multiprocessor similar in architecture to the UTAH/MIT system (Chen). Stanford's system is comprised of seven NSC-32016 single-board computers connected over Multibus to a SUN workstation host. One thrust of this research has been the development of an operating system which supports the multiprocessor environment with minimal user intervention.

Clemson University has developed a tree-structured real-time computer system for coordinated-motion of two industrial robots (Zheng). The architecture of this system is targeted for the control of two coordinating PUMA arms, but remains versatile enough so that the arms can be individually managed. The hardware consists of a VAX 11/750 host which interfaces to two LSI-11 processors; one LSI-11 processor and an associated cluster of microprocessor modules is connected to each robot. Most of the work has been in the design of a distributed operating system, REKCOR, which "sits on top" of each of the subsystems operating systems. REKCOR supports primitives which are necessary for the coordinated control of two-arms, besides standard operating system functions.

Hewlett Packard has developed a robot control system, HAL, which standardizes the control of many different types of robots using a single interface (Mujtaba). HAL is a combination of custom hardware and software based around a HP 9000 Pascal workstation. The custom hardware allows a single system, with a convenient user interface, to connect to many different types of manipulators. The robot control language of HAL is Pascal like and supports general coordinate rotation and translation constructs. Commercial robot systems usually come with their own controller. Since the controller is designed by the robot manufacturer, it is very difficult, if not impossible, to integrate robots from different manufacturers to work in harmony. Such an arrangement is necessary in any automated manufacturing environment.

Several special architectures have been proposed for robot control but were not actually built. Most of these proposals attack one particular segment of the robot control problem (e.g., the Jacobian calculation), attempting to optimize the speed of computation through the use of custom hardware. Some approaches constrain the manipulator characteristics (e.g., its geometry) thereby allowing more specialized hardware. Such specializations gain speed at the cost of flexibility. While these approaches lend important insight into portions of the overall robot control problem, it would be difficult to combine them in order to form a complete control system.

Lee and Chang reformulated the Newton-Euler inverse dynamic equations into a parallel set of equations well suited for parallel execution (Lee 1986a). The reformulation is obtained with the recursive doubling algorithm, and ideally suited for the execution on a multiprocessor system with an inverse perfect shuffle architecture. If the number of processors equals the number of links, this method generates O(log n) performance, where n is the number of links.

Lee and Chang also used a CORDIC chip (Lee 1986b), which was proposed by Haviland and Tuszyniski (Haviland), to develop a pipelined systolic array for evaluating the positional inverse kinematics. The structure of the systolic array is defined by the manipulator geometry, hence the resulting architecture is only suitable for one manipulator type. With this method, and assuming a CORDIC chip evaluation time of 40 microseconds, an evaluation time of 40 microseconds is quoted. The latency of the pipeline, and also its initial filing time, is 720 microseconds.

A real-time direct kinematic VLSI chip has been proposed by Leung and Shanblatt (Leung). The direct kinematic evaluation can be used to determine the manipulator's trajectory error in Cartesian space. As robots become more intelligent, this information can be used to compensate the motion accordingly. The authors report a simulation result of a 16-bit VLSI chip which can evaluate the direct-kinematics in 10 microseconds.

Amin-Javaheri and Orin (Amin-Javaheri) proposed a systolic architecture for the computation of the manipulator inertia matrix. The basic element of the systolic structure is a VLSI based reduced instruction set processor. The array maximizes execution speed by exploiting the nature of the inertia matrix. For example, since the inertia matrix is a real-symmetric matrix only half of the off-diagonal elements need to be computed.

Ling and Orin (Ling) proposed a restructurable VLSI architecture for robotic control. This approach considers the complete servoing problem and is based around the strategic connection of multiple copies of two different VLSI building blocks. One block processes scalars while the other processes 3-dimensional vectors. The control scheme realized is set by the interconnection of these blocks. This method was used to simulate the Inverse Plant plus Jacobian control method (Orin 1984b) and requires 1938 cycles to complete one cycle. If implemented, the actual cycle time will depend upon the speed of the fabrication technology.

3. REFERENCES

Amin-Javaheri, Masoud and David E. Orin, "A Systolic Architecture for, Computation of the Manipulator Inertia Matrix," *Proc of the IEEE Conf. on Robotics and Automation,* Raleigh, N.C., 1987.

Asada, H. and J. J. E. Slotine, *Robot Analysis and Control,* John Wiley and Sons, New York, 1986.

Barhen, J., Halbert, E. C. and J. R. Einstien, "Advances in Concurrent Computation for Autonomous Robots," *Proc. of the Robotics Research Conf.*, Scottsdale, Ariz., Aug. 18-21, 1986.

Brady, Michael et al., edited by, *Robot Motion: Planning and Control*, The MIT Press, Cambridge, Mass., 1984.

Chen, J. Bradley et al., "NYMPH: A Multiprocessor for Manipulation Applications," *Proc. of the IEEE Conf. on Robotics and Automation*, San Francisco, Calif., 1986.

Craig, John, *Introduction to Robotics, Mechanics, and Control*, Addison-Wesley, Reading, Mass., 1986.

Goldstein, Herbert, *Classical Mechanics*, Addison-Wesley, 2nd edition, Reading, Mass., 1980.

Haviland, G. L. and A. A. Tuszynski, "A CORDIC Arithmetic Processor Chip," *IEEE Trans. on Comp.*, vol. c-29, no. 2, pp 68-79, February 1980.

Kanade, Takeo et al., "Real-Time Control of CMU Direct-Drive Arm II Using Customized Inverse Dynamics," *Proc. of the IEEE Conf. on Robotics and Automation*, 1984.

Khosla, Pradeep K. and T. Kanade, "Real-Time Implementation and Evaluation of Model-Based Controls on CMU DD Arm II," *Proc. of the IEEE Conf. on Robotics and Automation*, San Francisco, Calif., 1986a.

Khosla, Pradeep K., "Real-Time Control and Identification of Direct-Drive Manipulators," Ph.D. dissertation, Carnegie Mellon University, Aug., 1986b.

Leahy, M. B. et al., "Real-Time Evaluation of Robotic Control Methods," *Proc. of the IEEE Conf. on Robotics and Automation*, St. Louis, Mo., 1985.

Leahy, M. B. and G. N. Saridis, "The RAL Heirarchical Control Sytem," *Proc. IEEE Conf. on Robotics and Automation*, San Francisco, Calif., 1986a.

Leahy, M. B. et al., "Efficient Dynamics for the PUMA-600, " *Proc. of the IEEE Conf. on Robotics and Automation*, San Francisco, Calif., 1986b.

Lee, C. S. G. and P. R. Chang, "Efficient Parallel Algorithm for Robot Inverse Dynamics Computation," *Proc. of the IEEE Conf. on Robotics and Automation*, San Francisco, Calif., 1986a.

Lee, C. S. G. and P. R. Chang, "A Maximum Pipelined CORDIC Architecture for Inverse Kinematic Position Computation," Internal Report #TR-EE-86-5, Purdue University, Oct. 1986b.

Leung, Steven and Michael Shanblatt, "Real-Time DKS on a Single Chip," *IEEE Journal of Robotics and Automation*, Vol. RA-3, no. 4, Aug. 1987.

Ling, Yong-Long C., *Layered Multiprocessor Architecture Design in VLSI for Real-Time Robotic Control*, Ph.D. dissertation, Ohio State University, Dec. 1986.

Luh. J. Y. S., M. W. Walker, and R. P. C. Paul, "On-Line Computational Scheme for Mechanical manipulators," *Trans. ASMA, J. Dynam. Syst., Meas. Contr.* vol. 120, pp. 69-76, June 1980.

Mujtaba, Shahid and William Fisher, "HAL, A Work Station Based Intelligent Robot Control Environment," *Proc. of Robots* 11/17th ISIR, Chicago, Ill, 1987.

Nakamura, Yoshihiko et al., "Unified Recursive Formulation of Kinematics and Dynamics of Robot Manipulators," submitted to the Journal of Dynamical Systems, Measurement and Control.

Siegel, David M. et al., "Computational Architecture for the UTAH/MIT Hand," *Proc. of the IEEE Conf. on Robotics and Automation*, St. Louis, Mo, 1985.

Volder, J. E., "The CORDIC Trigonometric computing technique," *IRE Trans. Electron, Computing*, vol. EC-8, No. 3, pp. 330-334, September 1959.

Zheng, Y., Luh, J. Y. S., and P. Jia, "A Real-Time Distributed Computer System for Coordinated-Motion Control oF Two Industrial Robots," *Proc. of the IEEE Conf. on Robotics and Automation*, Raleigh, N.C., 1987.

4. SUMMARY OF THE INVENTION

The present invention includes a processor designed to receive and execute a series of instructions provided from a memory, for carrying out vector/vector, and scalar/vector arithmetic operations on three-dimensional vectors and scalar/scalar arithmetic operations. The processor includes a data-transfer input for receiving the series of program instructions and data from the memory, and a three-wide, register-to-register architecture for parallel processing of three operands. The three-wide architecture is made up of (a) I, J, and K register files, each containing a plurality of registers for storing scalar values or individual vector components of three-dimensional vectors, (b) I, J, and K execution units for performing arithmetic operations on operands placed in the execution units, (c) I, J, and K operand pathways connecting each I, J, and K register file, respectively, with the corresponding I, J, and K execution unit, and (d) multiplexed buses for returning the results of the execution units to selected register locations.

A pair of broadcast buffers in the processor connect different pairs of operand pathways, for exchanging operands between the two pathways in each pair, in response to pathway exchange commands carried in the program instructions.

A data-transfer output passes selected operands from the processor to the memory, in response to write-to-memory commands carried in the program memory. Program instruction flow to the elements of the processor is controlled by a program evaluation unit which passes commands in the program instructions to the register files, the execution units, the broadcast buffers, the multiplexed data buses, and the data-transfer input and output. In a related embodiment, the processor includes the memory, preferably as individual program and data memory.

In a preferred embodiment of the invention, the processor further includes a CORDIC algorithm successive-add unit which implements two-dimensional coordinate rotations, using operands obtained from the three register files. The unit includes latches for storing the output values of the algorithm operation performed by the unit until the values are transferred as operands to selected execution units.

The program instructions are preferably pipelined from the program evaluation unit in fetch-operand, execute, and store-result stages.

These and other objects and features of the invention will become more fully apparent when the following detailed description of the invention is read in conjunction with the accompanying drawings.

DETAILED DESCRIPTION OF THE INVENTION

Figure 1:
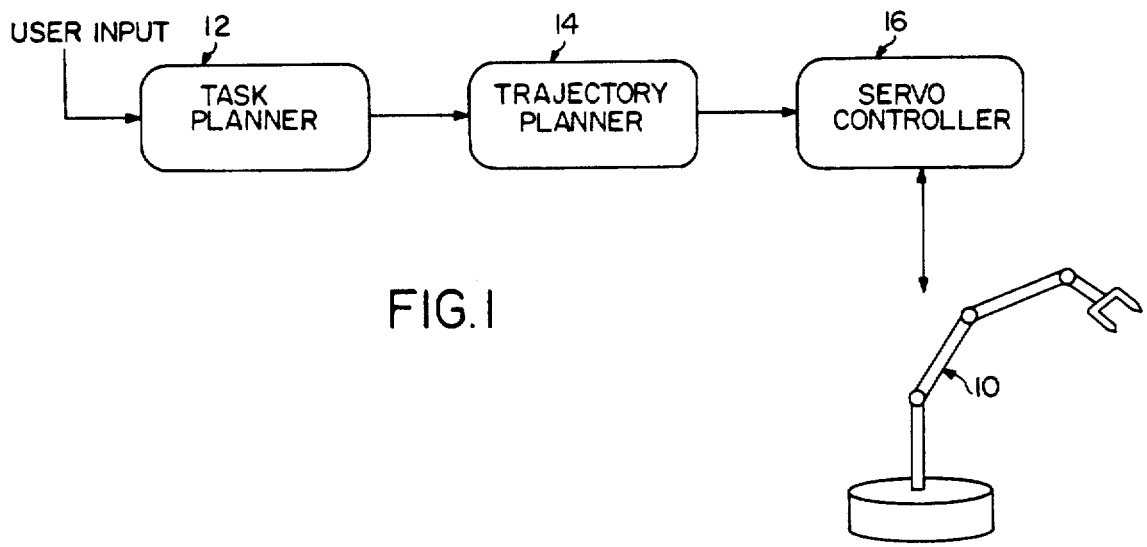
FIG. 1 shows the hierarchy of control levels in a system for d the motion of a robotic arm.

FIG. 1 shows a hierarchy of control algorithms used in controlling the motion of a robotic arm 10. The motion of the arm is controlled by a series of actuators which are governed by the control algorithms to carry out desired arm movements. A task planner 12 accepts high-level user input, such as typed or voice commands, and from the task presented, determines start and end positions, e.g., the initial position and final desired position of an end-effector on the arm. A trajectory planner 14 uses the task planner output to determine the locus of points through which the robotic arm advances in moving from initial to final positions. A servo-controller 16 uses the locus of points provided by the trajectory planner and from inverse kinematics and inverse dynamics calculations, plus control law evaluation, calculates the torques which must be applied to the robotic arm actuators to move the arm through the locus of trajectory point to-the desired final position.

As will be seen below, and according to an important feature of the invention, the novel processor of the invention can carry out the inverse dynamics and kinematics calculations required for determining actuator torque values in much less than 1 msec, allowing the motion of the robotic arm to be updated every millisecond, with additional program operations to be carried out between the servoing calculations. This feature allows real-time calculations of actuator inputs, at an update rate of about 1,000 times per second.

Figure 2:
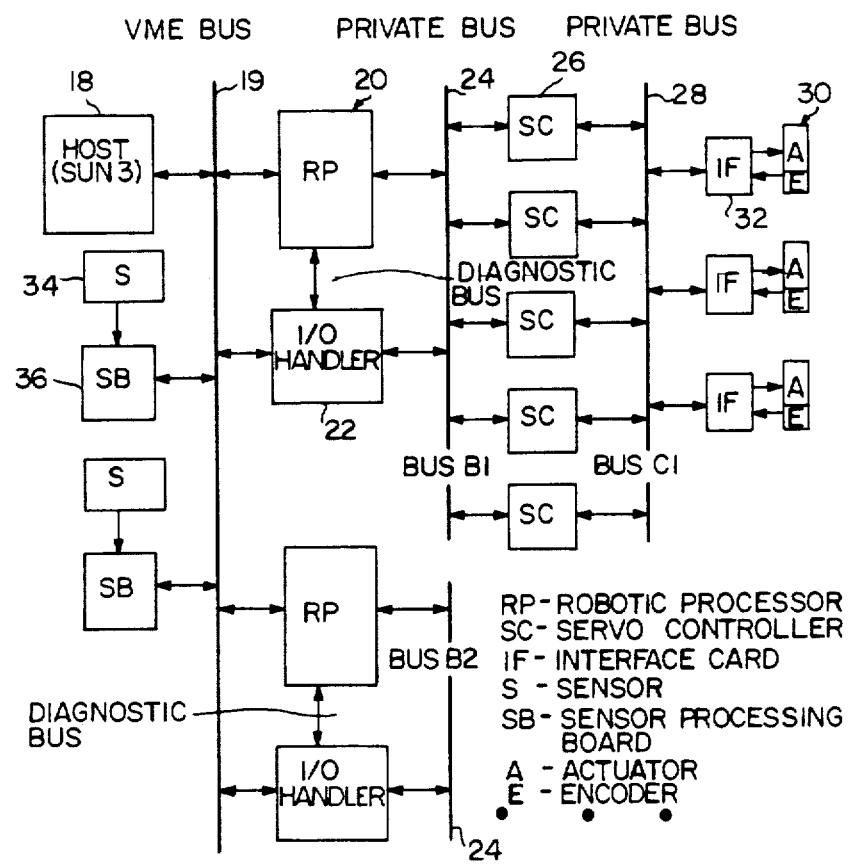
FIG. 2 block diagram of a robotics control system employing the robotics processor of the present invention.

FIG. 2 shows the system level architecture of a robotics instruction processor system employing the processor of the present invention. A host 18 provides the user interface to the system, as exemplified, for example, by a SUN/3 host operating under a UNIX system. The host communicates through a VME bus 19 with a processor (RP) 20 constructed according to the present invention, and detailed below. The system also includes an input/output handler 22 which functions to transfer data between the different processors in the system, as indicated. It also serves as the system synchronizer. The processor and I/O handler communicate through a private bus 24 with one or more servo-controllers (SC), such as controller 26. The servo controllers, which provide the servoing capabilities in the system, use a second private bus 28 to drive the manipulator actuators, such as actuator 30. Interface cards, such as card 32, perform the digital-to-analog and analog-to-digital translations needed to represent data in the needed format. The servoing motion executed by the system is monitored by sensors, such as sensor 34, which communicate with the processors in the system through sensor processing boards, such as board 36, as indicated.

In terms of the hierarchy scheme shown in FIG. 1, the task planner resides on host 18 in FIG. 2, and the trajectory planner and servo controller algorithms are carried out by processor 20. The servo controller also includes the I/O handler, servo controllers and interface cards needed for instructing the actuators in the robotics arm, and the sensory processing board for interfacing sensory information with the robotics process. The actuators and sensors in FIG. 2 are, of course, part of the robotics arm.

A. THREE-WIDE, REGISTER-TO-REGISTER ARCHITECTURE

The processor of the present invention, i.e., processor 20 in FIG. 2 above, is designed to efficiently perform a variety of vector/vector operations, such as vector addition and vector cross product operations, and scalar/vector operations, such as scalar/vector and matrix/vector multiply operations. More generally, as will be seen below, the processor is designed for rapid vector/vector and vector/scalar operations involving three-dimensional vectors, and scalar/scalar arithmetic operations.

As discussed above, kinematic and dynamic equations required for robotics actuator control can be efficiently formulated into three-dimensional vector equations. In fact, any rigid body dynamic problem can be expressed in three-dimensional vector notation (Goldstein). An intuitive reason can be given for the 3-D structure of these equations. Kinematic and dynamic equations provide mathematical expressions which explain the motion of three-dimensional rigid bodies in a three-dimensional space. Quantities like positions, velocities, accelerations, forces, and moments are conveniently described by 3-D vectors.

A good example of an algorithm expressed in 3-D vector notation is illustrated by the recursive formulation of the Newton-Euler's inverse dynamic equations (Luh). This formulation is presently the most efficient method for solving the inverse dynamic problem of a manipulator. The 3-D notation has been taken one step further by extending the recursive formulation of the inverse dynamic equations into an algorithm for evaluating the Resolved Acceleration control method (Nakamura). This formulation is extremely efficient because it eliminates the redundant calculations required for both the kinematic and dynamic evaluation.

Figure 3:
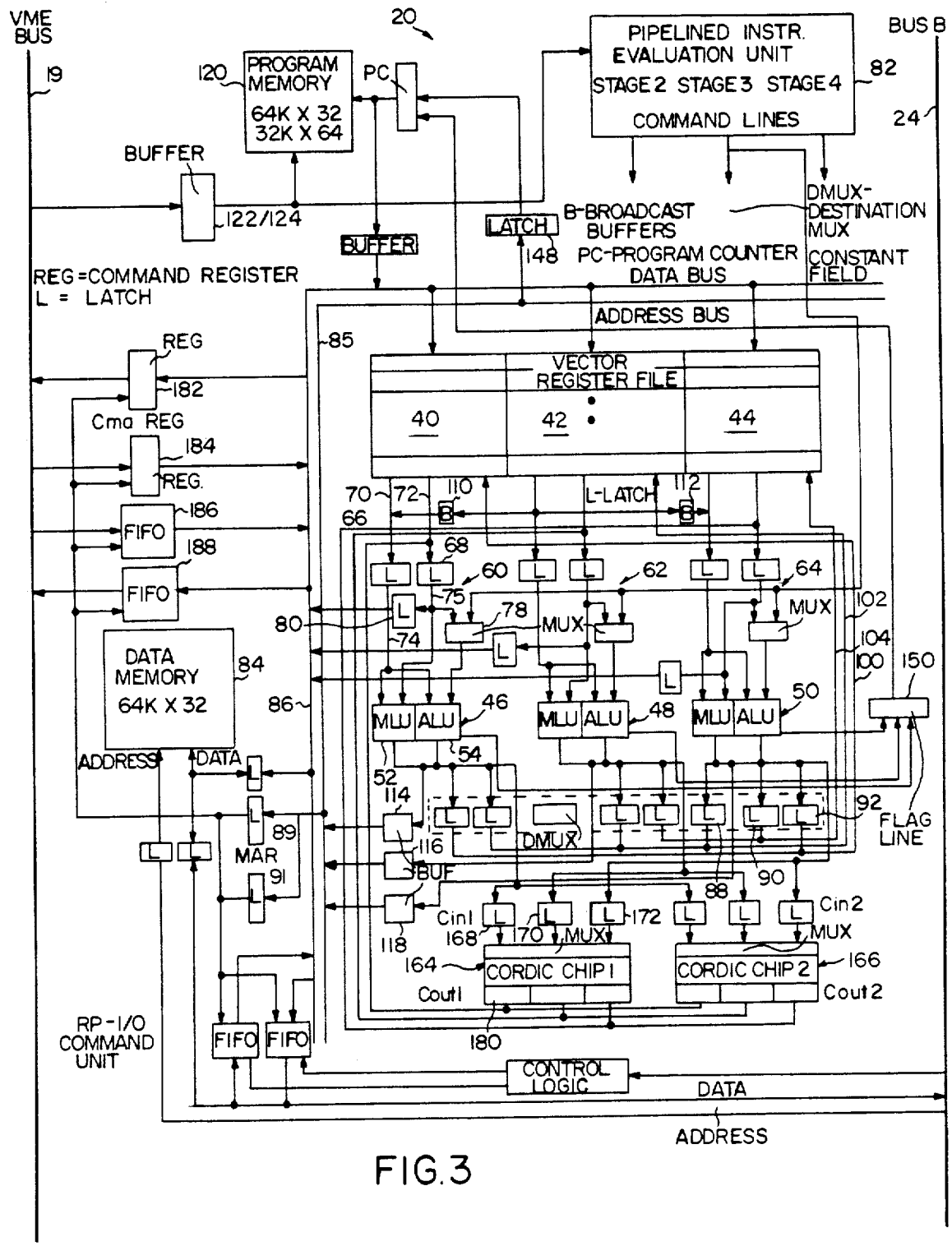
FIG. 3 is a block diagram of the processor of the present invention.

FIG. 3 is a block diagram of processor 20. The figure shows the VME bus 19 and private bus (bus B) 24 used in communications between the processor and other components of the robotics system shown in FIG. 2. Both buses, as well as other buses described herein, are preferably 32-bit buses.

An important feature of the processor is a three-component wide data path which facilitates fast and efficient three-dimensional geometric operations. The data path originates and ends with three register files 40, 42, 44, which are also referred to as I, J, and K register files, respectively. These files store the scalar values for the three components, such as the i, j, and k, components of three dimensional vectors. The instruction set is organized such that any vector register can be accessed as a single entity, such as A, or components of a vector register can be individually accessed, such as A.i (the ith component of the vector register A). In one specific embodiment of the processor, each 32-bit register file is created from two 16-bit AMD 29334 four-port dual-access register file chips, which makes a total of 64 3-D vector registers.

A large number of registers (such as 64) allows the programmer to maintain all of the commonly accessed variables simultaneously in the register file. Since internal processor registers provide the fastest storage media, providing many of these registers facilitates high-speed execution. In other words, data stored in internal registers can be accessed faster than data stored in primary memory, hence it is advantageous to store the data in the registers. In the specific processor being described, the number of registers was basically dictated by the size of the AMD 29334, and not by any optimum number. Such a number may be calculable from the robot control servoing algorithms which are used.

As part of the three-wide architecture, the processor includes I, J, and K execution unit 46, 48, 50, respectively, for performing arithmetic and logical operations. Unit 46, which is representative, is composed of a multiplier unit (MLU) 52, and an arithmetic logic unit (ALU) 54. The specific processor being described uses an AMD 29C323 32-bit MLU and an AMD 29332 32-bit ALU for each of its three execution units. Each chip is packaged in a 168-pin PGA to provide enough pins to support two dedicated 32-bit input buses and one 32-bit output bus. This facilitates a fast flow-through execution because no staging of input and output operands is necessary. Since the multiplier requires 80 ns for a multiplication, which is the slowest execution stage, the processor's clock speed is limited to 100 ns. The additional 20 ns is necessary for enabling and disabling staging latches. The ALU offers an elaborate array of possible instructions, as will be considered below.

The I, J, and K register files are connected to the associated I, J, and K execution units, respectively, by I, J, and K operand pathways indicated generally at 60, 62, and 64, respectively. These pathways function to transfer operands stored in selected locations in the register files to the corresponding execution files, in response to data-fetch commands in the program instructions, as will be considered below. Operand pathway 60, which is representative, includes first and second latches 66, 68 which receive operands from the first and second output ports of register file 40 through data buses 70, 72, respectively. A third data bus 74 in pathway 60 connects first latch 66 with both the MLU and ALU in the I execution unit. A fourth data bus 72 connects second latch 68 with the MLU in the execution unit, as shown. The latches just described and other latches used in the processor are 32-bit latches constructed using four 74AS574 IC 8-bit latch chips available from Texas Instruments.

Also included in operand pathway 60 is a third latch 80 which function to stage the contents of second latch 68 and a multiplexer 78 which functions to direct the contents of the third latch or a constant value supplied from a program evaluation unit (PEU) 82 to ALU 54, as indicated. The 32-bit multiplexer just described and other multiplexers used in the processor may be constructed using eight 4-bit 74AS157 IC multiplexer chips available from Texas Instruments. The function and construction of the PEU will be described below. At this point it is noted only that some arithmetic operations carried out by each execution unit involve a constant supplied by the program instructions from the PEU, through suitable command lines (not shown) connecting the PEU to the multiplexer. The contents of the third latch can also be transferred to a data memory 84, via a data bus 86, as will be considered further below. Multiplexer 78 and third latch 80 are also referred to herein collectively as multiplexing means. As seen in the figure, each of the three operand pathways in the processor has an associated-multiplexing means.

The results generated by the three execution units can be directed to (a) to selected locations in the register files, (b) data memory 84, via an address bus 85, or (c) one of the two CORDIC algorithm units, such as unit 164, in response to different store-operand commands carried in the program instruction. The structure and function of the CORDIC algorithm unit will be detailed below.

The structure used to return data from the execution units to selected locations in the register files includes a series of to-register latches, such as latches 88, 90, 92 associated with execution unit 50, which receive the operand results from respective execution units and selectively direct to the latch contents to selected register locations in response to write-to-register commands in the program instructions. As seen, the I and J execution units each have 2 to-register latches, and the K execution unit has three such latches. Three latches are required in the K unit to enable results from the K execution unit to be stored in any register file, for matrix/vector multiply operations. The data latched in the seven to-register latches are carried to the I, J, and K register files by I, J, and K return-data buses 100, 102, 104, respectively. The to-register latches and return-data buses are referred to herein collectively as data-return means.

The connection of each of the four ports of each register file can now be appreciated. Both of the output ports of a register file connect to the associated execution unit. One of the input ports comes from an external data bus 86, while the other input port provides the return path from the execution unit via the data-return means. Of course, the primary purpose of the register files is to store data operands, though because of the processor's vector arrangement, they serve the secondary purpose of providing a transition from the processor's external single-width data bus to the internal three-wide execution bus.

The results of the execution units can also be passed by buffers 114, 116, and 118, for storage into data memory 84, via address bus 85 and a data-memory address register, formed by latches 89, 91. The three latches and the data bus connections between the latches and the data memory, including bus 85 and latches 89, 91, are also referred to herein collectively as data-transfer output means for passing selected addresses from the execution units to memory, in response to memory-access commands carried in the program instructions. The data-transfer output is used, for example, for executing a store register indirect plus constant instruction, as considered below.

With the architecture shown in FIG. 3, it is impossible to access operands directly from the data memory for functional evaluation. Whenever the contents of the data memory are required, they must first be loaded into the register file. Furthermore, since the results of all functional instructions are returned only to the register, operands from the register file can only be stored into data memory by a store command. Consequently, the robotic processor is a register-to-register based machine. RISC (Reduced Instruction Set Computer) studies have indicated that this organization allows faster execution speed via higher clock speeds, though the original motivation for this architecture was because of the processor's vector format.

Even though a register-to-register machine can execute instructions faster than a memory-to-memory machine, the overall performance speed up is only advantageous if the number of load and store operations are kept to a minimum. Load and store instructions perform only data movement; no functional results are obtained. Quantitatively, the time required to execute the total number of load and store operations, for a given program, must be less than the difference in time between the given RISC implementation and a comparable CISC (Complex Instruction Set Computer) implementation. So in order for the RISC architecture to win, it is important that enough registers are available to maintain all of the commonly used operands within the register file.

One possible improvement to the design of register-to-register machines, would be to overlap the load and store operations with functional operations. Such a system would have the advantage of a register-to-register execution speed without the penalty of nonfunctional load and store operations. This approach has the potential difficulty, however, of in that it introduces hardware problems as well as complicates machine programming. For example, this capability requires that the programmer must be able to concatenate any load or store instruction with any other functional instruction. A more thorough investigation is necessary before such a scheme can be implemented.

As mentioned above, the embodiment being described has three 64-register files, giving capacity for 64 vector registers. These register files can also be considered as 192 scalar registers. This arrangement gives the robotic processor the unique capability of using the register file as a combination of vector and scalar register. Most computers have two different sets of registers, one for scalars and one for vectors. By combining both scalars and vectors into one storage unit, hardware resources are optimized and data movement time is saved.

Figure 4:
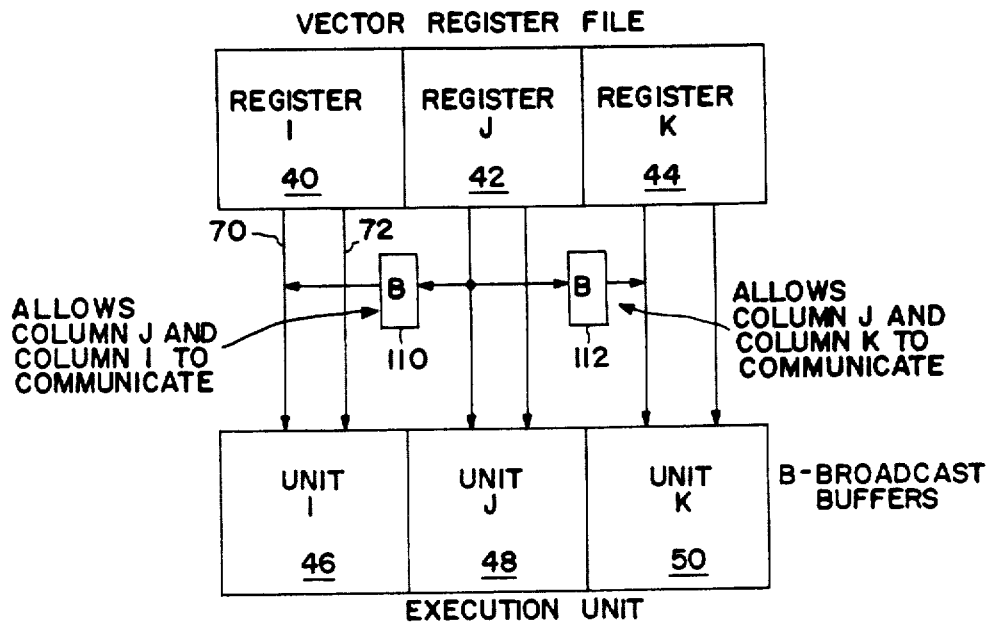
FIG. 4 is a block diagram showing how operand exchange between register is accomplished in the FIG. 3 processor.

The execution of each functional instruction begins by accessing the necessary operands from the register file. These operands enter the three-wide execution unit via six possible data paths. The execution unit is considered three columns wide because it consists of three ALUs and three multipliers connected in parallel. Two data paths originate from each column of the vector register file and connect to one column of execution unit. Each column consists of a parallel combination of one ALU and one MLU. First and second broadcast buffers 110, 112 are provided to support intercolumn operations. This capability is needed to facilitate operations such as matrix-vector multiplies, and inter-column scalar-scalar operations. FIG. 4 illustrates how the broadcast buffers allow operands from the I and J pair of operand pathways, and from the J and K pair of operand pathways to exchange. Specifically, buffer 110 allows transfer of an operand from the J to I operand pathway, and buffer 112, from the J to the K operand pathway. The 32-bit broadcast buffers, and other buffers used in the processor, may be constructed from four 8-bit buffer chips, as exemplified by 74AS244 buffers available from Texas Instruments.

The broadcast buffers of processor 20 are not fully general since only a subset of all possible paths are supported. This arrangement was chosen because our investigation showed that these data paths supported the necessary operations. Also, additional data paths added cost to the overall design. A more generalized robotic processor would supply all possible data paths, i.e., the four additional buffers need to connect all possible pairs of operand pathways in both directions.

As indicated above, one of the input ports of the ALU in each execution unit is multiplexed between the output of the register file and a constant field. This field comes directly from the control pipeline and is used to supply immediate and absolute operands from the program memory. Even though the absolute operands only requires 17-bits of precision to completely address the external data bus, a full 32-bit data path is needed to support the immediate operands.

After an instruction has been evaluated, the destination multiplexer returns the results from the execution unit to the register file. The destination multiplexer is capable of rearranging the resulting components before storing them. In other words, the output of the I execution unit can be returned to the I or J register file; the output of the J execution unit can be returned to the J or K register file; and the output of the K execution unit can go to any of the three register files. As in the broadcast buffers, only a subset of all possible interconnections was implemented in the prototype robotic processor. An investigation of robot control equations showed that this particular arrangement supports all of the necessary operations.

The destination multiplexer combined with the broadcast buffers gives the robotic processor its unique capability of supporting both fast and efficient 3-D geometric processing while maintaining good scalar performance. The best way to illustrate the robotic processor's capabilities is by example. Two very common 3-D geometric operations are the vector cross-product and the 3-D matrix-vector multiply. Cross product operations result whenever the derivative of a vector in a moving coordinate frame is calculated [Goldstein]. Matrixvector multiplies are used to perform coordinate rotations. Both of these operations are predominate in kinematic and dynamic equations. Tables 1 and 2 illustrate how the robotic processor is used to evaluate these operations. Other mathematic operations are described below.

TABLE 1

Matrix/Vector Multiple Operation $$\begin{bmatrix} A_{1,-} \\ A_{2,-} \\ A_{3,-} \end{bmatrix} [B] = [C]$$

| | |
|---|---|
| $A_{1,-} * B \rightarrow A_{1,-}$ | Vector Multiplication |
| $A_{2,-} * B \rightarrow A_{2,-}$ | Vector Multiplication |
| $A_{3,-} * B \rightarrow A_{3,-}$ | Vector Multiplication |
| $A_{1,i} + A_{1,j} \rightarrow A_{1,j}$ | Scalar Addition |

TABLE 1-continued
Matrix/Vector Multiple Operation $$\begin{bmatrix} A_{1,-} \\ A_{2,-} \\ A_{3,-} \end{bmatrix} [B] = [C]$$

| | |
|---|---|
| $A_{2,i} + A_{2,j} \rightarrow A_{2,j}$ | Scalar Addition |
| $A_{3,i} + A_{3,j} \rightarrow A_{3,j}$ | Scalar Addition |
| $A_{1,j} + A_{1,k} \rightarrow C_i$ | Scalar Addition |
| $A_{2,j} + A_{2,k} \rightarrow C_j$ | Scalar Addition |
| $A_{3,j} + A_{3,k} \rightarrow C_k$ | Scalar Addition |

A matrix-vector multiply requires 9 scalar multiplications and 6 scalar additions. The robotic processor can complete all 15 of these operations with 9 instructions, or within about 900 ns. Since the robotic processor executes each of these instructions with the same single-cycle format, once the pipeline is full, one instruction is completed every 100 ns. Though it should be remembered that the robotic processor is a register-to-register machine, the matrix and vector operands must be loaded into the register file before the operation can begin. The matrix will occupy three vector registers and the vector will use a fourth.

Since the robotic processor supports vector multiplication, or three simultaneous like-component multiplications, the 9 scalar multiplications can be completed with 3 instructions. Once the multiplications are complete, the components of each resulting vectors must be summed with an inner product operation. This is when the broadcast buffers and the destination multiplexer can be used to shuffle the scalar components so that the necessary scalar operations can be performed. The broadcast buffers allow different components of the same vector to be added, and the destination multiplexer deposits the result in the appropriate column. Note that the resultant vector is placed correctly in the register file. In other words, the ith component of the vector resides in the ith column of the register file. Therefore, this vector can immediately be used for further numeric operations.

A vector cross product (Table 2 below) requires 6 scalar multiplications and 3 scalar subtractions. It should be noted that a cross product can be formulated as a matrix-vector multiply by reorganizing the first vector of the operation as a skew-symmetric matrix (Table 3 below). Though the robotic processor can directly perform a cross product operation in 6 instructions, as shown in Table 2, note that a special "vector multiply with component rotate" instruction is used to help evaluate the operation. This instruction performs a vector multiply and shuffles the vector's components before restoring the result into the register file. In essence, the shuffling performs the same task as the skewing does when organized in the matrix-vector form. A NO-OP (no operation) instruction is placed as the fifth instruction because of the pipeline interdependencies. This problem is discussed in greater detail below. Of course, ideally this NO-OP would be replaced with a functional instruction for better hardware utilization.

TABLE 2
Vector Cross Product

| | |
|---|---|
| $C = A \times B$ | |
| $C.i = A.jB.k - B.jA.k$  $C.j = A.kB.i - A.iB.k$ | |
| $C.k = A.iB.j - B.iA.j$ | |
| $B.i \rightarrow T1.j, B.j \rightarrow T1.k, B.k \rightarrow T1.i;$ | rotate vector B |
| $A.i \rightarrow T2.j, A.j \rightarrow T2.k, A.k \rightarrow T2.i;$ | rotate vector A and store in T2 |
| $T1.i * A.i \rightarrow T1.j, T1.j * A.j \rightarrow T1.k;$ $T1.k * A.k \rightarrow T1.i$ | element-by-element vector multiply with vector rotation |
| $T2.i * B.i \rightarrow T2.j, T2.j * B.j \rightarrow T2.k;$ $T2.k * B.k \rightarrow T2.i$ | element-by-element vector multiply with vector rotation |
| NO-OP; | no operation due to pipeline interdependency |
| $T2.i - T1.i \rightarrow C.i, T2.j - T1.j \rightarrow C.j;$ $T2.k - T1.k \rightarrow C.k$ | element-by-element vector subtraction |

TABLE 3
Cross Product in Skew Symetric Form $$\begin{bmatrix} 0 & -a_k & a_j \\ a_k & 0 & -a_i \\ -a_j & a_i & 0 \end{bmatrix} \begin{bmatrix} b_i \\ b_j \\ b_k \end{bmatrix} = \begin{bmatrix} c_i \\ c_j \\ c_k \end{bmatrix}$$

The illustration of the matrix-vector operation demonstrates that the robotic processor can perform scalar operations as well as vector operations. In fact, the robotic processor is unique in the sense that it performs vector, scalar, and vector/scalar operations all with the same hardware and with good efficiency.

The need for vector and scalar operations was demonstrated by the cross-product and matrix-vector multiply operations. Vector/scalar operations can also be useful. For example, they can be used to scale vector quantities. Consider Newton's second law:

$$\vec{f} = m\vec{a}$$

This equation can be thought of as scaling the acceleration vector by the mass in order to determine the force vector. This equation can be easily evaluated by the robotic processor with a single vector/scalar multiply. The scalar must originate from the jth column of the register file where it can be simultaneously broadcast (by the broadcast buffers) to all three columns of the execution unit.

Even though scalar operations only utilize one-third of the hardware, the ability to perform all three types of operations with the same hardware allows tremendous flexibility and generality. Basically, if programmed properly, the robotic processor has all of the capabilities of a high performance general purpose microprocessor with added performance for operating on 3-D vectors.

B. PROGRAM EVALUATION UNIT

Program instructions are executed under pipelined control from PEU 82 to the three-wide, register-to-register processor architecture described above, which increases computation speed. Thus, the PEU is a pipelined instruction evaluation unit (PIEU), and will be referred to herebelow as PIEU 82.

A consistent four-stage pipelined instruction execution format was adopted for the following reasons: simplicity of design, reduced design time, and a faster clock speed. For classification purposes, a nonfunctional instruction performs only data movement or program control. In this case, the only nonfunctional instructions are load, store, and jump instructions.

All functional instructions are evaluated in the following sequence: 1) instruction fetch, 2) operand fetch, 3) instruction execute, and 4) operand store. This allows the design of the control unit to be greatly simplified, therefore a higher clock speed can be achieved. A higher clock speed is possible because a simpler design implies simpler, and hence faster, logic. A register-to-register structure helps to maintain this execution format.

Since the flow of each functional instruction is consistent, pipelining the instruction execution was made much easier. The primary problem of pipelining is to resolve all possible hardware contention problems, consequently a consistent instruction format simplifies the bookkeeping of what hardware is used at what time. For example, with the functional instructions the instruction fetch uses the program memory, the operand fetch uses the register file, the instruction execute uses the execution unit, and the operand store also uses the register file. Since the register has separate input and output ports, which can operate simultaneously, the operand fetch and operand store can occur simultaneously. The difficulty in pipelining the robotic processor was to conform the functional and nonfunctional operations into a compatible structure. Appendix A illustrates how each category of instruction is partitioned in order to solve this problem.

One of the more complicated instructions to conform to this four-stage format is the ST A.i (Reg Indirect+-Constant) instruction. This instruction stores the value of register A.i into the data memory at address location (Reg Indirect+Constant). The first stage of this instruction is an instruction fetch, like all other instructions. During stage two, both the data stored in A.i and the indirect address register are accessed and latched. Stage 3 passes the data to a data bus latch such as latch 80, where it is stored for one cycle before it can be placed into data memory. Simultaneously, an ALU adds the indirect address to a constant and stores the result in the data memory address register. The constant is passed from the control unit to the ALU in the I execution file through an appropriate multiplexer. Stage 4 addresses the data memory using the data memory address register, and stores the data in the data bus latch into the appropriate memory location. By following this instruction through FIG. 3, it can be seen that the interconnection between the appropriate data paths is very important. For example, it is very important that the first, rather than the second, output port of the register file is connected from the register file to the data bus latch. This allows the data operand and the address operand to be simultaneously processed.

Figure 5:
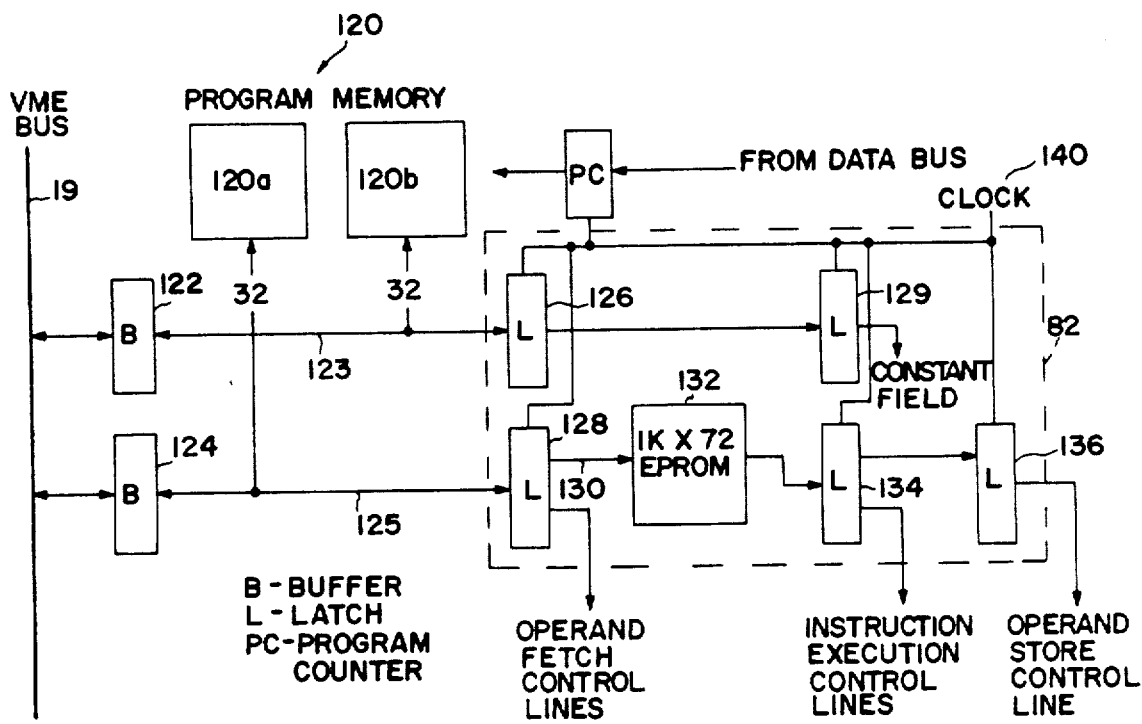
FIG. 5 is a block diagram of the pipelined instruction evaluation unit of the processor, and related program memory and communication components.

FIG. 5 shows the construction of PIEU 82, and the communication to the VME bus 19, a program memory 120, and the PIEU. Since the robotic processor maintains separate data and program memory, the program memory and data memory they can be arranged in different formats. As will be discussed further below, the program memory is arranged in a 64-bit format to simplify the instruction execution process and the hardware design of the control unit. During each instruction fetch, a new 64-bit work is read from the program memory into the control pipeline. This long word is partitioned into two 32-bit words; the lower word forms a constant field and the upper word defines the instruction. As shown in FIG. 5, the program memory is actually composed of a 32-bit instruction memory 120a, and a 32-bit constant-field memory 120b. Each 32-bit memory is formed of 16 8K×8 Fugita 81C78 chips. The program memory is loaded from the VME bus through a pair of buffers 122, 124, as shown, alternating between each memory as each 64-bit instruction word is entered, at consecutive even and odd addresses in the two memories, thus allowing each 64-bit instruction word to be addressed with a single address. The two 32-bit buses connecting buffers 122 and 124 and memories 120a and 120b to the PIEU are indicated at 123 and 125 respectively. These buses, and above-mentioned data bus 86 connecting the data memory to the register files, are also referred to herein as data-transfer input for receiving the series of program instructions and data from memory.

The PIEU, which is shown within dashed lines 82 in FIG. 5, is basically a sequence of latches and firmware decoders. Once a new instruction is latched by the first set of latches 126, 128, the control signals for reading the source operands from the register file are passed down into the processor. The 32-bit constant field word passes from latch 126 to a 32-bit latch 129. From this latch, the constant field can be placed in one of the execution ALU's, through the associated MUX, as can be appreciated from FIG. 3. Since the ALUs are only used during the third stage of execution, the constant field enters the ALUs during this stage.

Figure 15:
FIG. 15 shows a breakdown of the microcoded word used by the processor.
Figure 15:

The 64-bit instruction word is divided by latch 128 into a 10-bit EPROM address and a 22-bit operand store and fetch instruction. The latter instruction is directed from latch 128 to appropriate processor elements. The 10-bit EPROM address word is passed on a bus 130 to address a microcoded EPROM 132 for further decoding of the instruction. Since EPROMs are used to decode each instruction, the instruction set can be easily changed. One preferred EPROM is a 7C263 EPROM supplied by Cypress. As will be seen below with reference to FIG. 15, the EPROM outputs a 46-bit instruction used for program execution, and a 26-bit instruction containing a variety of post-execution commands. The 46-bit and 26-bit outputs of the EPROM are carried by a 72-bit bus to a 72-bit latch 134. The 26-bit word from the EPROM is further passed to a latch 136, where the word codes are distributed to appropriate elements in the processor. The word codes in the 46-bit words are distributed from latch 134 to the appropriate execution elements in the processor.

The last stage of latches in the control pipeline broadcast the appropriate control signals to complete each instruction. For functional instructions, this involves selecting the proper outputs of the destination multiplexer as well as writing the results into the appropriate location in the register file.

The instruction processing procedure of the robotic processor was kept simple for both design and speed purposes. Pipelining was included to increase the execution speed of the processor. Basically, pipelining increased the execution speed four times.

Each of the latches in the PIEU is controlled by a clock 140 as shown. The maximum clock speed of any pipelined system is limited by the propagation delay of the slowest stage. In this case, the execution unit is the slowest stage since the MLU's require 80 ns to complete a multiply. Since a set up time of the input and output latches must also be included, a 100 ns clock cycle is used. The other three stages require much less processing time. In fact, one way of increasing the clock speed is to divide the execution unit into two stages. This change could possible double the clock speed, hence higher performance might be possible.

With reference to both FIGS. 3 and 5, a program counter 144 may receive a "jump" instruction address from a 16-bit address stored in a latch 148 and received from the data bus. A flag unit 150 which is described in Section C below provides a yes/no signal to the counter for acting on the jump address in the latch. The counter is connected to clock 140, as indicated.

C. CONDITION CODES

The robotic processor uses three AMD 29332 ALUs to support 3-D vector arithmetic and logic functions. The AMD 29332 provides status bits for the following functions: carry, zero, negative, overflow and linking. Consequently, all of the standard conditional operations are possible.

Since the robotic processor has three ALUs it has the unique feature of having three sets of status bits. By checking for different combinations of these bits it is possible to perform some interesting operations. For example, a useful condition to check for is the zero vector condition. In other words, check and see if all three components a vector are zero. The test for this condition is to simultaneously examine all three zero bits.

Figure 6:
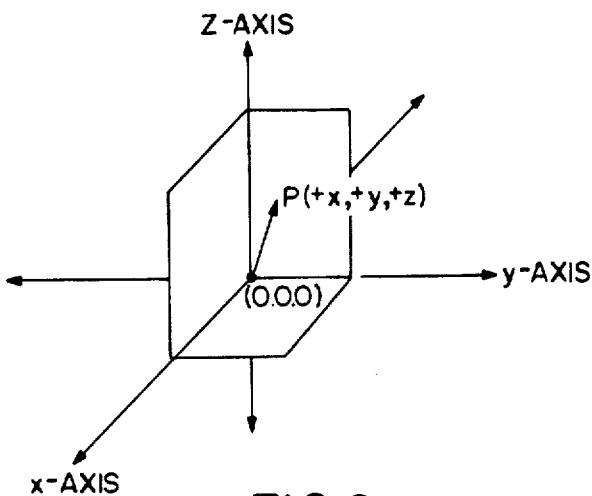
FIG. 6 illustrates the use of the processor's flag unit for checking the direction of a vector.

Many other possibilities can also be envisioned. For example, it would be possible to immediately determine whether or not a 3-D vector is in a particular quadrant. FIG. 6 illustrates a check for determining whether or not a vector is in the first quadrant of a 3-D space. Perhaps the problem is not how to develop these new conditions, but rather to determine which of these many possibilities will prove useful. Since the answer was not clear during the design of the processor, a very general flag test unit had to be designed.

Figure 7:
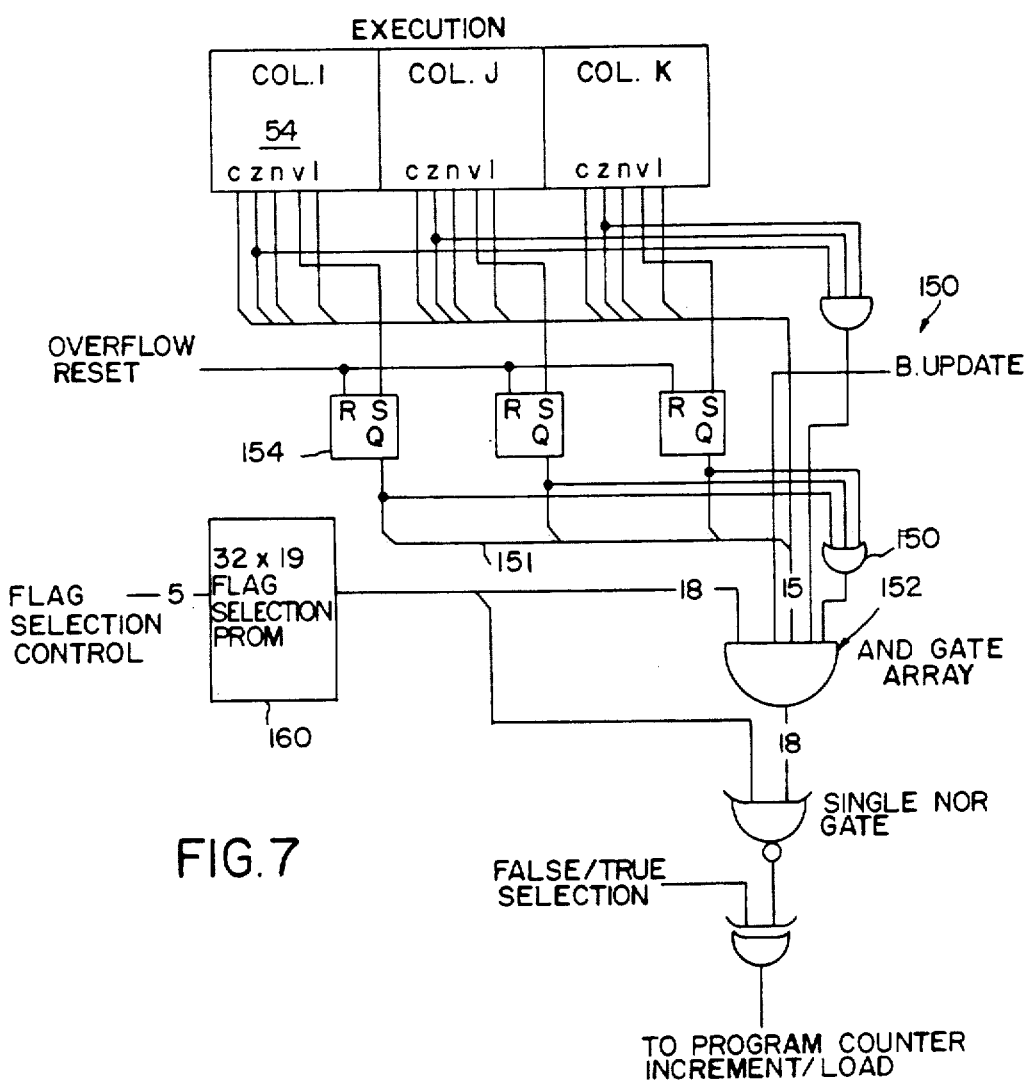
FIG. 7 is a block diagram of the processor flag unit.

A schematic block diagram of flag unit 150 is shown in FIG. 7. Here each of the ALUs, such as ALU 54, are shown with their five accumulator registers with c, z, n, v, and 1 registers. The 15 register bits are connected through a 15-bit bus 151 to an array of 15 AND gates, indicated generally at 152. Each of the three overflow (v) registers is routed through a set/reset flip-flop, such as flip-flop 154 which is used mark overflow events, and the output of the three flip-flops is gated through an OR gate 157 whose output in turn is gated by a sixteenth AND gate in array 152. The z register values and a B Update (below) are gated through two additional AND gates in the AND gate array as indicated.

Each of the AND gates in the array is also connected to an 18-bit flag selection PROM 160 which can be used to test for any register state, or any combination of states, as discussed above. Depending on whether a selected state is present, the flag unit outputs a yes/no signal to the program counter, as indicated.

The flag unit is general in the sense that any combination of these 15 status bits can be checked for. But in order to avoid excessive hardware, and the fact that not all of these combinations will be useful, only 32 of these possibilities can be implemented at a given time. The selected 32 combinations are programmed into firmware, hence they can be easily modified. Explaining further, the hardware merely sensitizes the desired conditional path. One input of each of these gates is from the flag section PROM. Therefore, in order to test the zero status bit of the ith ALU, the corresponding AND gate is activated by the PROM. Note that more than one AND gate can be simultaneously activated whenever a condition which uses a combination of status bits is desired. This capability of activating more than one status bit is what gives the flag unit its generality. The final XOR gate allows the testing for both the true and complement of any combination. The XOR outputs to the program counter to determine whether or not to load a new program address.

Another interesting problem associated with multiple status bits is that the correct one must be used whenever testing the results of scalar operations. For example, it is important to test the status bits of the kth column's ALU if the condition under test used the kth column for execution. This bookkeeping is fairly simple to do when writing in assembly language, but ultimately high-level programming capabilities are desired. In this case, the compiler will need to automatically determine and test the correct bit.

The processor allows individual testing of any of the status bits, and has also included a couple of vector combinations. As mentioned earlier, a zero vector test condition is implemented. A vector overflow test has also been incorporated. The vector overflow condition can simultaneously check to see if any mathematical operations, vector or scalar, has caused an overflow condition. Note the overflow bit is latched so that only one check can determine whether or not an overflow occurred during a sequence of operations. A special B Update condition has also been included to allow the processor to branch whenever a new update pulse is received. This allows a fast and efficient means to acknowledge a new update period.

D. CORDIC ALGORITHM UNIT

Solving a robot manipulator's kinematic and dynamic equations generally involves performing multiple coordinate transformations and trigonometric function evaluations. An intuitive explanation is that robot calculations are generally performed in several different coordinate frames. Consequently, once a parameter has been calculated in one coordinate frame it is often necessary to translate its value into a new reference frame for further calculations. Since robot manipulators are generally attached at a fixed base, trigonometric relationships are required for expressing the necessary relationships.

A good example of this is the Recursive Newton-Euler inverse dynamic equations. These equations calculate the angular velocity of each link with respect to the links own frame. Therefore, in order to determine the angular velocity of the link with respect to the base, the velocity of the preceding links must also be accounted for. A coordinate transformation placing both of these values in the same reference frame is necessary before this addition can be performed. The coordinate transformation is comprised of a matrix of which many require elements solving trigonometric relationships.

The robotic processor attacks this problem by incorporating two novel CORDIC coprocessors into its design. The CORDIC coprocessor is a custom VLSI chip which was designed in support of the present invention. The CORDIC algorithm is not new, but the CORDIC chips architecture is unique. The initial design of the CORDIC chip, the one used for the present processor, calculates to only 25 bits of accuracy because of constraints on the dye size. Its architecture is a massively parallel implementation of the CORDIC algorithm, and requires over 63,000 transistors for this 25 bit version.

The same construction and operation can be applied to a 32-bit unit.

The name "CORDIC" stands for Coordinate Rotation Digital Computer. This algorithm was developed by (Volder), and was originally incorporated into computers for real-time navigation purposes. The CORDIC algorithm implements two-dimensional vector, or coordinate, rotations with only simple shift and add operations. Even though the CORDIC algorithm only offers linear convergence, since shift and add operations are generally among a computer's fastest operations, vector rotations can be performed at a very high speed. If set up properly, these vector rotations can be used to evaluate trigonometric functions.

The CORDIC algorithm is based on the fact that a vector $(x_1, y_1)$ rotated through an angle theta may be expressed as:

$$x_2 = \cos\theta\, (x_1 -/+ y_1 * \tan\theta) \tag{1}$$

$$y_2 = \cos\theta\, (y_1 +/- x_1 * \tan\theta)$$

where $(x_2, y_2)$ is the resultant vector. The choice of addition or subtraction depends on the direction of rotation.

As mentioned earlier, the CORDIC algorithm performs these coordinate rotations with only simple shift and add operations. Because computers are very fast at shifts and adds, the algorithm can be evaluated very fast. The technique which allows this, which is the key to the CORDIC algorithm, is to set:

$$\tan\theta = 2^{-(i-1)} \quad i = 1, 2, 3, \ldots n. \tag{2}$$

Therefore, cos theta becomes:

$$1/(1 + 2^{-(i-1)})^x \tag{3}$$

and by plugging these expressions into equations 1, they become:

$$x_{i+1} = 1/(1 + 2^{-(i-1)})^x (x_1 -/+ y_1 * 2^{-(i-1)}) \tag{4}$$

$$y_{i+1} = 1/(1 + 2^{-(i-1)})^x (y_1 +/- x_i * 2^{-(i-1)})$$

where $(x_{i+1}, y_{i+1})$ represents the new vector after the ith iteration. We can rewrite these equations by adding a variable $delta_i$ to set the direction of rotation for each iteration. The selection of $delta_i$ determines the actual CORDIC operation and is discussed later in this section. By including $delta_i$, the equations become:

$$x_{i+1} = k_i(x_1 + delta_i y_i * 2^{-(i-1)}) \tag{5}$$

$$y_{i+1} = k_i(y_i + delta_i x_i * 2^{-(i-1)})$$

where
$k_i = 1/(1 + 2^{-(i-1)})^x$
and
$delta_i = +/-1$.

Therefore, after n iterations we have rotated a vector by the amount:

$$\theta = \Sigma\, delta_i \arctan 2^{-(i-1)} \quad i + 1, 2, 3, \ldots, n. \tag{6}$$

This equation shows that with the proper selection of $delta_i$'s the CORDIC algorithm can rotate a vector through an angle theta. Of course, only angles which can be generated by this summation are possible. [Volder] proved that with this formula, n iterations will give a result accurate to n-bits for any arbitrary rotation between $+/-90$ degrees. This result also indicates that the CORDIC algorithm offers linear convergence.

The factor $k_i$ represents a scaling factor intrinsic to the CORDIC algorithm. Note that $k_i$ is independent of $delta_i$. Therefore, if the number of iterations is a fixed number n, we can factor out a constant K equal to the products of the $k_i$, from $i = 1, 2, 3\ldots n$. Therefore we can write equation 5 in the form:

$$x_{i+1} = (x_1 - delta_i y_i * 2^{-(i-1)}) \tag{7}$$

$$y_{i+1} = (y_i + delta_i x_i * 2^{-(i-1)})$$

and the final vector $(x_n, y_n)$ can be scaled by a constant K after the nth iteration.

To increase the maximum range of rotation from $+/-90$ degrees to $+/-180$ degrees, an additional 90 degree rotation can be performed by changing the first iteration to the following:

$$x_2 = -delta_1 y_1 \tag{8}$$

$$y_2 = +delta_1 x_1.$$

This operation performs an exact rotation of the initial vector by $+/-90$ degrees depending upon the chose of delta. The remaining $n-1$ iterations are performed as before. So equations 7 become:

$$x_{i+1} = (x_1 - delta_i y_i * 2^{-(i-2)}) \tag{9}$$

$$-y_{i+1} = (y_i + delta_i x_i * 2^{-(i-2)})$$

The CORDIC algorithm can operate in two basic modes: Rotate and Vector. The Rotate operation routes a vector by a specified angle. This operation can be used for coordinate rotations as well as vector rotations since one is merely the opposite of the other. In other words, a vector rotation by 30 degrees is equivalent to a $-30$ degree rotation of the coordinate system.

Figure 8:
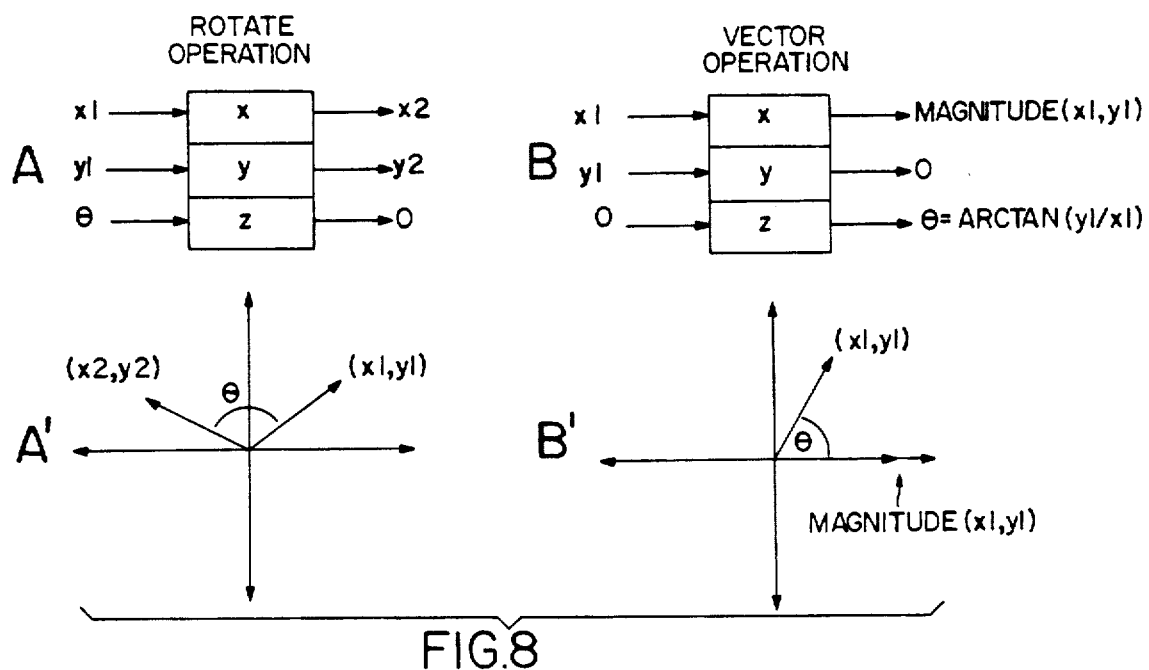
FIG. 8 illustrates vector rotate (A and A') and vector (B and B') operations performed by the CORDIC algorithm chip in the processor.

The Rotate operation, illustrated in FIG. 8A and 8A', can also be used for trigonometric function evaluations. The sine and cosine of an angle theta can be evaluated with a Rotate operation by initializing a unit vector directed along the positive x-axis. After the Rotate operation, the vector is rotated through an angle theta, and the x and y components become Ksin theta and Kcos theta. The offset constant can be easily factored out. Notice that both the sine and cosine of theta are evaluated simultaneously. Generally both results are needed in kinematic and dynamic equations.

The Vector operation rotates an arbitrary vector onto the positive x-axis. The result of this operation is essentially a transformation between Cartesian and polar coordinates. In other words, a Vector operation will take a vector $(x_1, y_1)$, and output the results arctan $(y_1/x_1)$ and sqr$(x_1^2 + y_1^2)$. The arctangent operation is used frequently in robotic computations.

The Rotate and Vector operations only differ by the method in which delta is selected. For the Rotate operation, a z-register is initially loaded with the desired angle of rotation theta. Upon each successive iteration, the incremental rotation is added or subtracted from the contents of the z-register, depending upon the-current sign of the z-register. In other words, the sign of z governs the choice of $delta_i$. If the current value of z is positive, $delta_i$ is chosen as $+1$. If the value of z is negative, $delta_1$ is chosen as $-1$. With this formula it is easy to see that after each iteration, z tends closer towards zero. Since $delta_i$ also controls the rotation of the $(x_i, y_i)$ vector, the final vector is rotated by theta. The mathematical equation that governs the operation of the z-register can be written as:

$$z_{i+1} = z_i - \text{delta}_i \arctan(2^{-(i-2)}). \tag{10}$$

The Vector operation initialized the value of z to zero. Upon each iteration the new value of delta$_i$ is determined by the current sign of the y-register. If y is positive, delta$_i$ becomes $-1$. If y is negative, delta$_i$ becomes $+1$. This strategy will drive the y register to zero, or rotate the vector onto the x-axis. After the final iteration, the magnitude of the initial vector is in the x-register, and the angle of rotation is in the z-register. Consequently, the Vector operation performs a transformation between Cartesian coordinates and polar coordinates.

The robotic processor exemplified herein employs two CORDIC subsystems or units to perform coordinate rotations and trigonometric function evaluations. The output of each unit appears to the user as another vector register. Therefore, the same move instructions as those used to move data about in the register file can be used to read from the CORDIC units. Since a CORDIC operation takes much longer than the other processor instructions, the program must wait a predefined time between loading input operands and reading the final results. When a high-level language is used, the compiler must account for this time automatically. Each unit is loaded by a Vector or Rotate instruction which specifies the register of the intended operand. A scaling vector is included so that the intrinsic scaling factor of the CORDIC algorithm can be compensated with a premultiply before placing the operand into the unit's input latches.

The processor shown in FIG. 3 has two CORDIC units 164, 166. As seen, each unit contains three input latches, such as latches 168, 170, 172, associated with unit 164, which can receive operands directly from the I, J, and K execution units, respectively. These latches stage the operands for unit operation.

Figure 9:
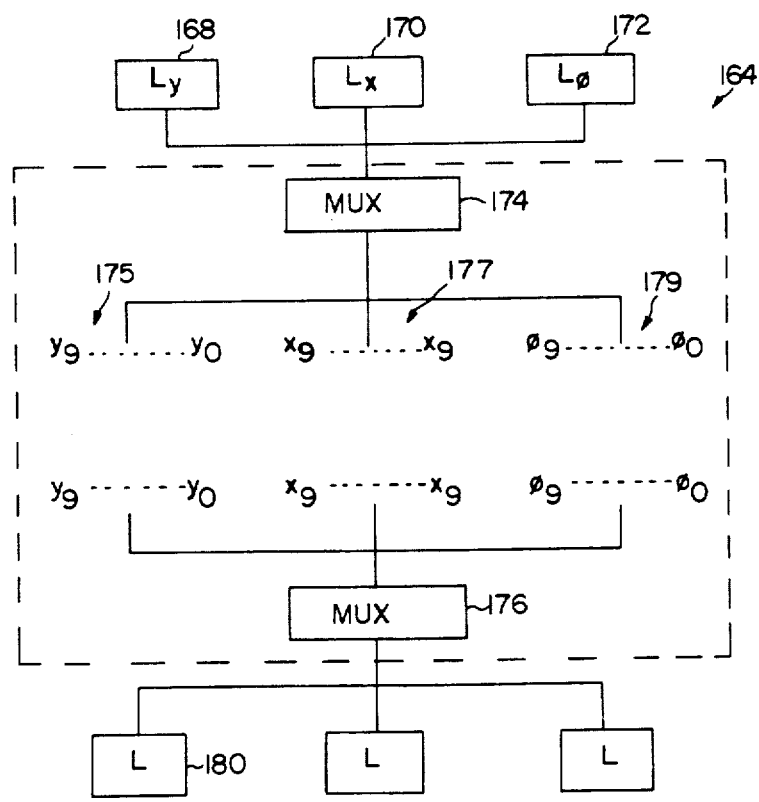
FIG. 9 block diagram of the CORDIC algorithm unit.
Figure 10:
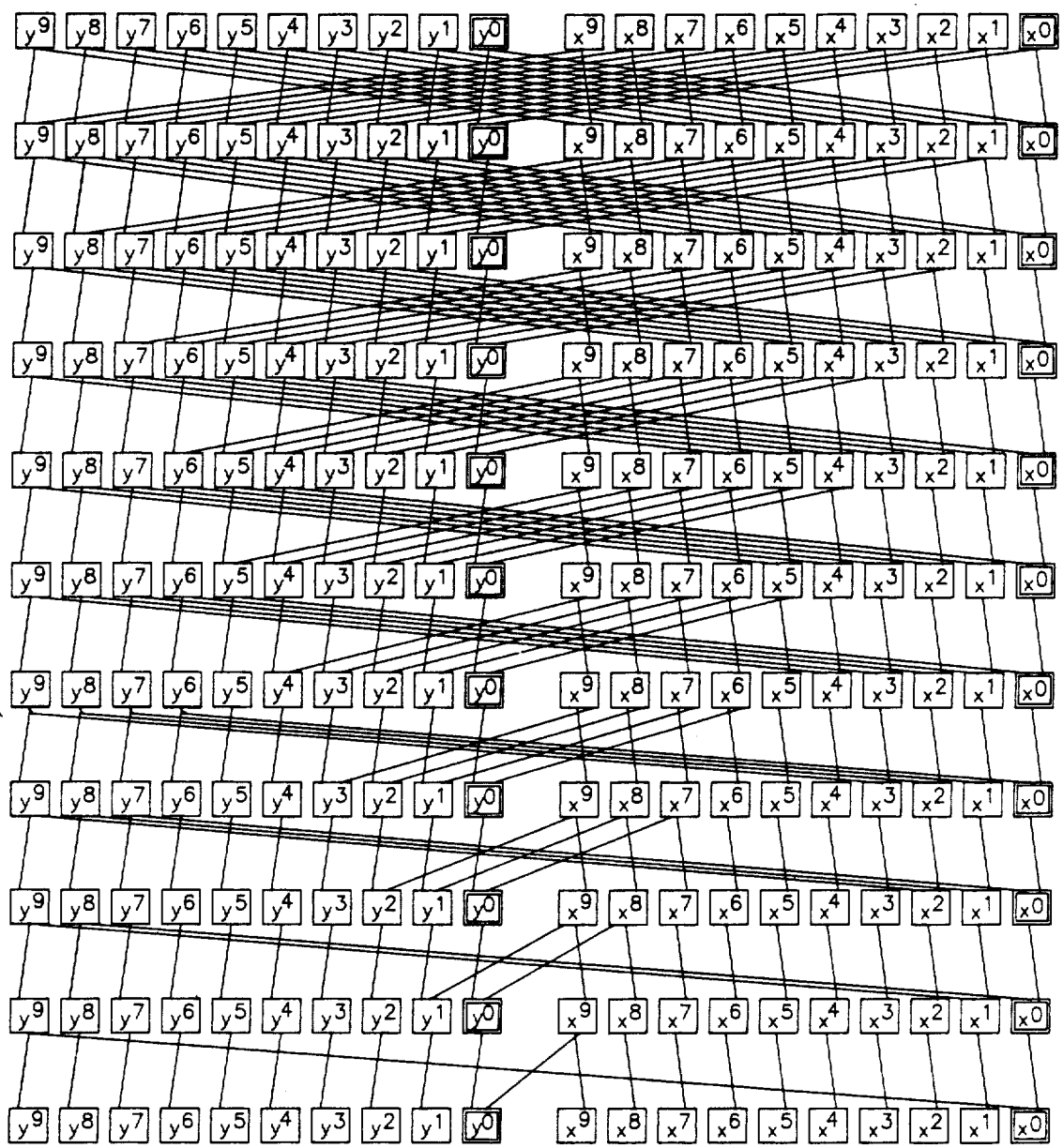
FIG. 10 shows the successive-iteration adder connections between 10-bit x and y operands in the chip of the CORDIC algorithm unit.
Figure 11:
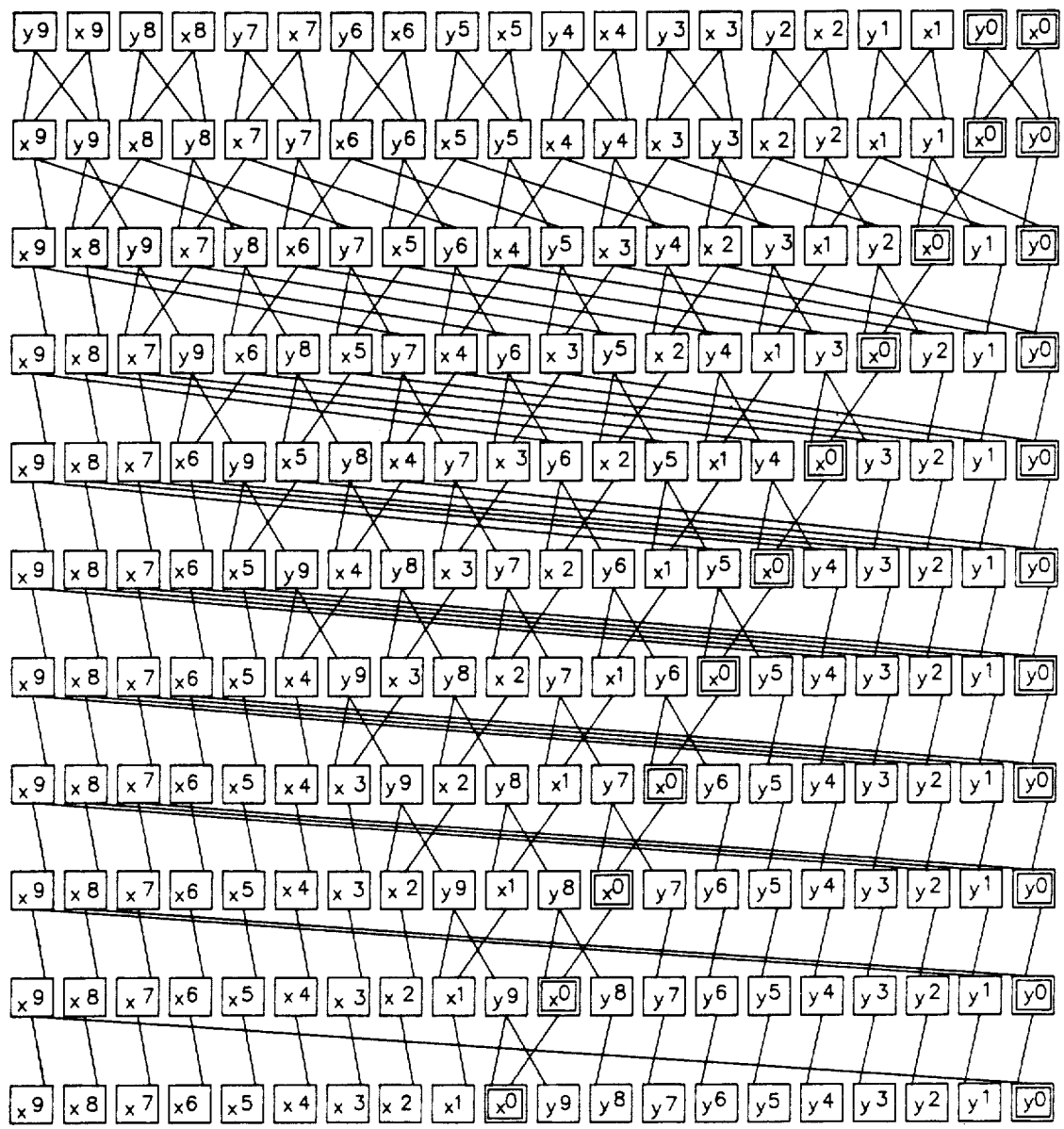
FIG. 11 shows the actual arrangement of adders in the FIG. 10 chip.

Unit 164, which is representative, is shown in greater detail in FIGS. 9-11. FIG. 9 shows the three latches 168, 170, 172 which receive the input operands, such as the vector components x and y and the angle theta of vector rotation. For illustrative purposes, the operands will be considered as 10-bit numbers, since the general principles described below will apply as well to larger numbers, e.g., 32-bit numbers. A multiplexer 174 in the chip functions to direct the contents of each latch onto the first row of adders, indicated in the figure at 175, 177, and 179 by 10 adders for each of the three operands. The adder architecture consists of 3 columns of n-bit adder cells each n cells deep. FIG. 10 shows the x and y columns of 10-bit adders for illustrative purposes. The series of additions which are performed on the two columns implement equation 9, by successive add operations which converge on the solution. One major advantage of this architecture is that the shifts required in equation 9 are eliminated since the shifts are built directly into the connecting pattern between the adders. Also, since the unit operates asynchronously, all of the signals can travel at their maximum speed to derive the answer.

FIG. 11 shows a diagram of the VLSI organization for the x and y adder columns in a IC chip used in the unit. The V pattern which overlies the length of the chip is due to the interchanging of x and y adders. An interleaved pattern was chosen in order to minimize the length of interconnecting wires. The interconnection between adders was the most difficult part of the chip to implement.

With reference again to FIG. 9, the results of the algorithm are passed from the three columns in the final row of adders by a multiplexer 176 to three output latches, such as latch 180 which stores the results of the x column. As seen in FIG. 3, these latches are each connected to an associated I, J, or K operand pathway. The CORDIC unit latches, such as latch 180, serve the same purpose as the corresponding I, J, or K register file, in that the data in them is called up by program instruction for use by the associated execution unit.

The CORDIC chips add another degree of parallelism to the robotic processor. Since the CORDIC units are separate from the execution unit, they can operate simultaneously. The method with which the CORDIC subsystems are attached to the processor allows more chips to be easily added.

E. PROCESSOR MEMORY AND INTERFACING

The robotic processor is specifically designed for real-time robot control applications. Consequently, the design was optimized for fast run-time execution. A separate program and data memory is used to overlap instruction fetch and data-memory-access operations. This separation also allows the two memories to be formatted differently, as discussed above. Generally, such an organization is called a Harvard architecture [TI], and has already been successfully exploited by many digital signal processors. Overlapping the instruction fetch with the data-memory-access obviously improves execution speed.

The program memory is organized in a 64-bit long word format. Since every instruction can be completely expressed in 64 bits, a new instruction is fetched every clock cycle. This format allows a simple decoding scheme which facilitates the fast and simple processing of each instruction. The data memory is formatted as 32-bit words, which is the standard operand width.

Robot control programs intrinsically execute in a looping fashion. This loop is performed once every update cycle. Consequently, the size of the robotic processor's program memory only needs to be large enough to store one copy of the entire control loop. A 32 kilo long word (64-bits) program memory was considered large enough to store most complex control algorithms, hence this size is used in the system. Since a new instruction completes every 100 ns (once the pipeline is full), it would take 3.5 milliseconds to sequentially execute through the entire program memory. Of course, generally there will be many subloops in one cycle of the control algorithm.

A 64 kilo word (32 bits) data memory was considered large enough to store the necessary data for advanced control algorithms. One area of robotic research which requires large amounts of memory is learning control. Learning control algorithms use the information of past trajectories to improve its performance on future iterations. Many different algorithms have been proposed to compensate for past errors. Sixty-four kilo words should be sufficient to even support this type of research.

The robotic processor can communicate with the other processors in the FIG. 2 system via three different channels. A command register is provided for immediate communication with the host, and a command unit is provided for sequential communication with the host. The I/O handler (FIG. 2) can also directly access the robotic processor's data memory for transferring data from any of the attached servo controllers or the host.

The command register consists of two 32-bit registers 182, 184, one facing each direction. The most significant 8-bits of each register send predefined status instead of data. Status information, like whether the robotic processor is in run mode or program mode, is available to the Host. Consequently, only 24-bits of data can be transmitted between the Host and robotic processor with the command register.

The command unit is made from two 64-deep 32-bit FIFOs 186, 188, one facing each direction. The command unit can be used to transmit asynchronously sequential data between the processors. There are many possible uses for this channel. For example, trajectory data, which is inherently sequential, can be easily passed from the Host to the robotic processor.

The command registers are visualized as a "command" passing unit, though they could also be used to transmit data. Direct memory to memory transfer facilities are provided for data sharing. A special processing subsystem, the I/O Handler, controls all such interprocessor data transferring. Also seen in FIG. 3 are data and address interfacing between the B bus 24 in FIG. 2 and the data memory and processor data and address buses.

F. UPDATE INTERRUPT AND FUNCTION CALLS

The robot control problem can be divided into many different levels. Task planning, trajectory planning, and servoing is a common taxonomy for such a division. The servoing algorithm would generally operate at around a 1 millisecond update rate. The trajectory planner, depending upon the control strategy, would update at roughly 100 milliseconds, and the task planner would update on the order of a second. Consequently, if one control system is to perform all of these functions, a simple means must be provided to nest these different levels.

Figure 12:
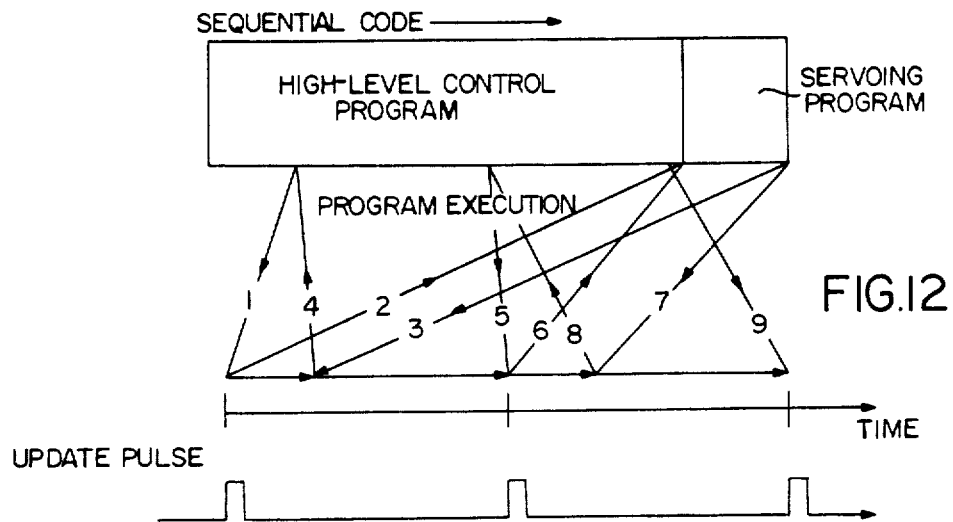
FIG. 12 illustrates the multiplexing of the main high-level control algorithm for robotics motion control with the servoing algorithm.

A solution to this problem is provided with the robotic processor by including a dedicated interrupt, which is illustrated generally in FIG. 12. This solution basically only solves the nesting of the servoing algorithm with higher-level control. The included interrupt is triggered upon each update period, and can be used to initiate the evaluation of the servoing algorithm, provided that the servoing algorithm is placed as the interrupt service routine. With this strategy, a higher-level control algorithm, which has a slower update cycle, can be evaluated as the main routine. Upon each update pulse, the servoing algorithm is evaluated, new torques are output to the robot's actuators, and control is returned to the main routine. The numbered lines in FIG. 12 show the multiplexing of the main high-level control algorithm with the servoing algorithm.

Note that this strategy is only possible if the servoing algorithm can be performed in a fraction of the servoing update time. Otherwise there would be no additional time to evaluate the higher-level control algorithms. Presently, no control system has the necessary computational power to evaluate advanced servoing algorithms and still have remaining time for more computations. The present processor is the first robot control processor capable of such a feat.

The interrupt instruction is essentially a vectored branch instruction which is activated by the update pulse. In the present processor, the vector location is programmed into firmware so that it is easily changed. Of course, upon branching to the interrupt service routine, the program counter and the status bits must be saved so that the processor can be restored to its original state after completing the interrupt service routine. The robotic processor accomplishes these tasks by saving the program counter in a predefined register of the register file, and storing the status bits in internal storage registers which are hidden from the user. The return from the interrupt service routine is performed by a RTI instruction. This instruction merely transfers the data from the predefined register to the program counter. Therefore it is important that the programmer must be careful not to overwrite the stored program counter value. If that register is needed, the programmer must first move the contents into the data memory.

The robotic processor's also supports function calls by providing a JSR and a RET instruction. The JSR instruction works identically to the interrupt instruction except that it stores a different program counter value, and that it uses a different predefined register. The RET instruction is identical to RTI except that it restore the program counter from the predefined register used with JSR, and not the interrupt instruction.

Since there is no designated stack or windowed registers, the passing, storing, and overwriting of variables is left up entirely to the user. The method was incorporated basically to simplify the hardware design. Also, since robot control algorithms are generally straight code with very few control statements, this arrangement does not present much of a programming difficulty.

The JSR and interrupt jump instruction store different values of the program counter. In both cases, delayed values of the program counter are stored into predefined register. The reason delayed values are stored is because of the pipelined nature of the processor. The program counter is always 4 counts ahead of the last complete instruction. The JSR and the interrupt instruction store different PC values because they return to different locations. A return from subroutine, or RTS, begins execution immediately after the calling JSR instruction, whereas a return from interrupt, or RTI, must begin execution on the instruction which was replaced by the interrupt instruction. Note that the interrupt instruction is processed after the currently executing instruction.

Figure 13:
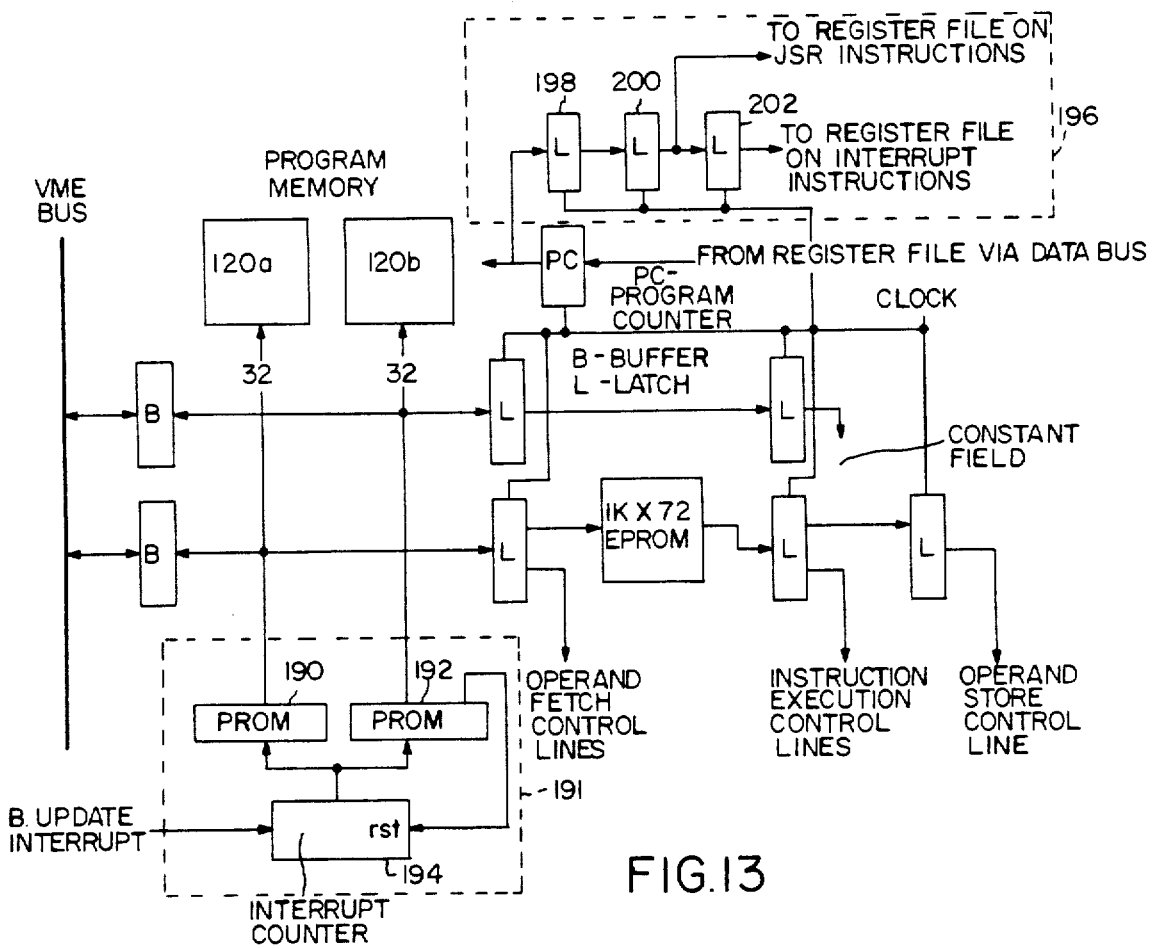
FIG. 13 shows hardware needed to support the interrupt operations involve in high-level control of the processor.

FIG. 13 shows the hardware needed to support these operations. The interrupt hardware is shown in dashed lines at 191. When an interrupt occurs, the program memory is disabled and instructions to the PIEU are supplied from PROMs 190, 192 which together contain the 64-bit interrupt instructions. A counter 194 cycles the PROMs through successive instructions, and control is returned to the program once the interrupt cycle is complete. The 8-bit PROMs and 4-bit counters are conventional discrete logic.

The hardware used for storing the program counter on JSR and interrupt instructions is shown in dashed lines at 196. This hardware includes a sequence of latches 198, 200, 202 from which different delayed versions of the program can be stored in the register file.

G. INSTRUCTION SET

The instruction set of a processor allows a user to interface with the hardware. Therefore it is essential that all of the hardware's abilities can be exploited by the instruction set. If the instructions do not allow efficient use of the hardware then either the hardware is poorly designed or the instruction set is ill-planned.

The robotic processor's instruction set is programmed in firmware so it can be easily modified. Hopefully enough control points were placed in the hardware so that the hardware can be exploited effectively. As more experience is gained in programming RIPS, most likely new instructions will be desired. Perhaps the hardware can already be properly controlled to accommodate these new instructions.

Figure 14:
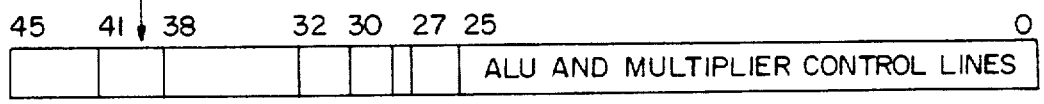
FIG. 14 illustrates the partitioning of a 64-bit instruction word into two 32-bit words used by the processor.

A listing of the present processor's instruction set is given in appendix B. Many powerful instructions, such as single cycle n-bit shifts and single cycle normalizing, are possible. As discussed above, each 64-bit program instruction is read by the processor as two 32-bit word, one containing execution instructions, and the other containing a constant field. FIG. 14 shows two instruction word, and the consecutive, even/odd addresses assigned to the two words in each instruction. The upper 32 bits can be further partitioned as shown in FIG. 14. The top 10 bits determine the opcode and the bottom 22 bits give the source and destination operands of the instruction.

The 10 opcode bits are decoded by EPROM 132, as discussed above, to give a completely horizontal encoding of the processor's control points. In computer architecture terms, the opcode would be considered as completely vertically encoded since the 10 bit combination merely represents ad address to the EPROM. After decoding, a set of 72 control bits are used to control the instruction execution process. A breakdown of the microcoded word is shown in FIGS. 15A and 15B, which show the 46-bit execution instruction (15A) and the 26-bit post-execution instruction (15B) outputted by the EPROM.

The instruction set of the robotic processor provides all of the standard instructions one would expect to find in a scalar processor, plus many more specialized instructions. Note that some of the instructions use vectors as operands while others use scalars. There are also instructions which combine scalars and vectors. For example, the instruction ADD Cj, A, B adds the scalar value in Cj to each of the components of vector A and stores the result in vector B.

The instruction set includes several CORDIC instructions. Since there are two CORDIC units, and each unit can perform both Rotate and Vector operations, there are a total of four CORDIC instructions. Section E discussed the intrinsic scaling problem of the CORDIC algorithm. The robotic processor solves this problem by automatically pre-multiplying the input operands with the inverse of the scaling factor ($1/K$). Pre-multiplying allows greater precision than post-multiplying since $K$ increases the magnitude of the final result, and an overflow occurs whenever the original operand is larger than $1/K$. Once an overflow occurs, a post-multiplication cannot recover the result.

H. APPENDICES

The following Appendices referred to above are included:

1. Appendix A, showing instruction execution formats.
2. Appendix B, showing the instruction set for the processor, as it functions in a robotics control system.
3. Appendix C, with Schematics 1, 2, and 3. Schematic 1 is a schematic diagram for the three execution units in the processor, the flag unit, and the program counter. Schematic 2 is a schematic for the portion of the processer in FIG. 3 shown above the data bus. Schematic 3 is a schematic diagram of the portions of the FIG. 3 processor below the data bus in the figure, but without the flag unit and program counter (shown in Schematic 1).

While the invention has been described with reference to particular embodiments and operations, it will be apparent that various changes and modifications can be made without departing from the invention. In particular, the processor described herein was designed as an integral part of a multiprocessor system to be used for real-time advanced robot control strategies. This processor is optimized for the task of evaluating robot kinematics and dynamics. Since the equations of these problems can always be written in a 3-D vector formulation, the processor was designed to exploit this particular characteristic. Consequently, any problem which can be written in a 3-D vector style matches well to the robotic processor's architecture, hence can be evaluated fast and efficiently.

One area of current interest is dynamic and kinematic simulations. Obviously the robotic processor architecture is well suited for such a problem since solving kinematics and dynamics are what it does best, though it should be noted that the main advantage of the robotic processor is its ability to solve such problems in real-time. If the targeted problem does not have any real-time requirements, other general purpose processors might also give satisfactory performance.

Natural animation is another possible area of application. The idea behind natural animation is to incorporate physics into an animated scene. For example, if the animated scene is of a bouncing ball, the ball should automatically known how high to bounce. The only way to provide such information is to incorporate such parameters as gravity, the mass of the ball, and the upward force exerted from the ground. Consequently, these dynamic equations can be solved while the animated scene is being created. The end effect is a much more real-looking motion. Presently these motions are performed by the intuitive feel of the animator. Natural animation would not only give more accurate results, but also relieve much of the tedious work which today's animators must deal with.

APPENDIX A-1

Appendix A - INSTRUCTION EXECUTION FORMATS:

All instructions are executed by a single pass through a four stage pipeline. The first stage of every instruction is an instruction fetch and therefore not shown here. In order to avoid hardware conflicts due to pipelining, operands can be fetched from the register file only during stage 2 and stored into the register file during stage 4. The data memory can only be accessed during stage 4, however the data memory address register (DMAR) is loaded during stage 3. The execution unit can only be used during stage 3.

Note that all functional instructions are executed in the same format.

acronyms used:   DB - Data Bus   DMAR - Data Memory Address Register
ALU - Arithmetic Logic Unit    PCLR - Program Counter Latch Register
DMUX - Destination Multiplexer

|  | Stage 2 | Stage 3 | Stage 4 |
|---|---|---|---|
| Functional Instructions: | | | |
|  | fetch source operands from register file | execution inst. with execution unit | store results in register file |
| Non-Functional Instructions: | | | |
| LD (abs), A |  | pass (abs) thru ALU from const. field and latch into DMAR | address DM and store in register A |
| LD (Imm), A |  | pass (Imm) thru ALU from const. field and latch into DMUX | store from DMUX into register A |
| LD (Reg Ind), A | fetch (Reg Ind) from register file | pass (Reg Ind) thru ALU and latch into DMAR | address DM and store in register A |
| LD (Reg Ind + C), A | fetch (Reg Ind) from register file | add C to (Reg Ind) with ALU and latch into DMAR | address DM and store in register A |
| ST A, (abs) | fetch A from register file | latch A into DB latch and pass (abs) thru ALU and latch into DMAR | address DM and store data from DB latch |

APPENDIX A-2

| | | | |
|---|---|---|---|
| ST A, (Reg Ind) | fetch A and (Reg Ind) from register file | latch A into DB latch and pass (Reg Ind) thru ALU into DMAR | address DM and store data from DB latch |
| ST A, (Reg Ind + C) | fetch A and (Reg Ind) from register file | latch A into DB latch and add C to (Reg Ind) with ALU and latch into DMAR | address DM and store data from DB latch |

JC represents both conditional and absolute jump instructions. If the condition is not true, the new PC address is not latched from the PCLR (performed in stage 4).

| | | | |
|---|---|---|---|
| JC (abs) | | pass (abs) from const. field thru ALU into PCLR | latch new PC address from PCLR |
| JC (Reg Ind) | fetch (Reg Ind) from register file | pass (Reg Ind) through ALU and latch into PCLR | latch new PC address from PCLR |
| JC (reg ind + C) | fetch (Reg Ind) from register file | add C to (Reg Ind) with ALU and latch into PCAR | latch new PC address from PCLR |
| JSR (abs) | | pass (abs) from const. field thru ALU into PCLR | Store PC into reg file and flags into internal regs. Load PC from PCLR |
| JSR (Reg Ind) | fetch (Reg Ind) from register file | pass (Red Ind) thru ALU and latch into PCLR | Store PC into reg file and flags into internal regs. Load PC from PCLR |
| JSR (Reg Ind + C) | fetch (Reg Ind) from register file | add C to (Reg Ind) with ALU and latch into PCLR | store PC into reg file and flags into internal regs. Load PC from PCLR |
| RTS | fetch return address from register file | pass return addr. thru ALU and latch into PCLR | restore flags from internal regs. and load PC from PCLR |
| INT | fetch jump addr. | pass jump addr. | store PC into reg |

APPENDIX A-3

|  |  |  |  |
|---|---|---|---|
|  | from interrupt hardware | thru ALU and latch into PCLR | file and flags into internal regs. Load PC from PCLR |
| RTI | fetch return address from register file | pass return addr. thru ALU and latch into PCLR | restore flags and internal regs. and load PC from PCLR |

APPENDIX B-1

Appendix B - ROBOT PROCESSOR'S INSTRUCTION SET

Arithmetic Instructions n = i, j, or k  referring to the different vector components

| | | |
|---|---|---|
| CLR | A | ; Clear all three components of vector reg A |
| CLR | A.n | ; Clear the nth component of vector reg A |
| CMP | An, Bn | ; Compare the nth scalar component of A<br>; with the nth scalar component of B. Set<br>; flags to the corresponding outcome. (The<br>; operation A(n) - B(n) provides the<br>; necessary flag information). |
| CMP | A, B | ; Compare vectors A and B and set<br>; corresponding flags. |
| CMP | A.i, B.j | ; Compare the ith element of A with the jth<br>; element of B and set the corresponding<br>; flags. |
| CMP | A.j, B.k | ; Compare the jth element of A with the<br>; kth element of B and set the corresponding<br>; flags. |
| ADD | A, B, D | ; Add vectors A and B and place in D |
| ADD | C.j,A,B | ; Add jth component of C to each vector component<br>; of A and store in the vector B |
| ADD | #number, A.n ,B.n | ; Add #number to the nth component of A and<br>; put in nth component of B |
| ADD | A.n, B.n, C.n | ; Add the nth component of A to the nth<br>; component of B and place in the nth<br>; component of C. |
| ADD | A.i, B.j, C.i | ; Add the ith component of A to the jth<br>; component of B and place in the ith<br>; component of C. |
| ADD | A.i, B.j, C.j | ; Add the ith component of A to the jth<br>; component of B and place in the jth<br>; component of C. |
| ADD | A.j, B.k, C.k | ; Add the jth component of A to the kth<br>; component of B and place in the kth<br>; component of C. |
| ADD | A.j, B.k, C.i | ; Add the jth component of A to the kth<br>; component of B and place in the ith<br>; component of C |
| ADD | A.j, B.k, C.j | ; Add the jth component of A to the kth<br>; component of B and place in the jth<br>; component of C |
| ADD | A.ij, B.ij, C.ij | ; Add the i and j components of A to the<br>; same components of B and place in the i<br>; and j components of C |

APPENDIX B-2

| | | |
|---|---|---|
| ADD | A.jk, B.jk, C.jk | ; Add the j and k components of A to the<br>; same components of B and place in the j<br>; and k components of C |
| SUB | A, B, D | ; Subtract vector B from A and place in D |
| SUB | A, C.j, B | ; Subtract C[j] from each vector component<br>; of A and store in the vector B |
| SUB | A.j, C, B | ; |
| SUB | A.n, #number, B.n | ; Subtract immediate from the<br>; nth component of A and place in B[n]. |
| SUB | A.n, B.n, C.n | ; Subtract the nth component of B from the<br>; nth component of A and place in the nth<br>; component of C. |
| SUB | A.i, B.j, C.i | ; Subtract the jth component of B from the<br>; ith component of A and place in the ith<br>; component of C. |
| SUB | A.i, B.j, C.j | ; Subtract the jth component of B from the<br>; ith component of A and place in the jth<br>; component of C. |
| SUB | A.j, B.k, C.k | ; Subtract the kth component of B from the<br>; jth component of A and place in the kth<br>; component of C. |
| SUB | A.j, B.k, C.i | ; Subtract the kth component of B from the<br>; jth component of A and place in the ith<br>; component of C. |
| SUB | A.j, B.k, C.j | ; Subtract the kth component of B from the<br>; jth component of A and place in the jth<br>; component of C. |
| SUB | A.ij, B.ij, C.ij | ; Subtract the i and j components of B from<br>; the same components of A and place in the<br>; i and j components of C. |
| SUB | A.jk, B.jk, C.jk | ; Subtract the j and k components of B from |
| SUBVR | A, B, C | ; Subtract vector followed by RTC<br>; the same components of A and place in the<br>; j and k components of C. |
| MULT | A, B, D | ; multiply the components of vectors A and<br>; B together and place results in D |
| MULT | C.j, A, B | ; Multiply Vector A by the scalar C[j] and<br>; place result in B. |
| MULT | #number, A.n, B.n | ; Multiply A[n] with #number and place in B[n]. |
| MULT | A.n, B.n, C.n | ; Multiply the nth component of A to the nth<br>; component of B and place results in the<br>; nth component of C. |
| MULT | A.i, B.j, C.i | ; Multiply the ith component of A to the jth<br>; component of B and place in the ith<br>; component of C. |
| MULT | A.i, B.j, C.j | ; Multiply the ith component of A to the jth<br>; component of B and place in the jth<br>; component of C. |

APPENDIX B-3

| | | |
|---|---|---|
| MULT | A.j, B.k, C.k | ; Multiply the jth component of A to the kth<br>; component of B and place in the kth<br>; component of C. |
| MULT | A.j, B.k, C.i | ; Multiply the jth component of A to the kth<br>; component of B and place in the ith<br>; component of C |
| MULT | A.j, B.k, C.j | ; Multiply the jth component of A to the k.h<br>; component of B and place in the jth<br>; component of C |
| MULT | A.ij, B.ij, C.ij | ; Multiply the i and j components of A to the<br>; respective components of B and place in<br>; the i and j components of C |
| MULT | A.jk, B.jk, C.jk | ; Multiply the j and k components of A to<br>; the respective components of B and place<br>; in the j and k components of C |
| NEG | A.n, B.n | ; Take the two's complement of<br>; the nth component of A and place in the<br>; nth component of B |

Load and Move Instructions

| | | |
|---|---|---|
| LD | addr, A | ; Load each vector component of A with the<br>; same value from DM[addr]. |
| LD | addr, A.n | ; Load the nth component of vector A with<br>; DM[addr]. |
| LD | (Rn), A | ; Load each vector component of A with the<br>; value in DM pointed to by register R[n]. |
| LD | (Rn), A.n | ; Load the nth component of A with the<br>; value in DM pointed to by register R[n]. |
| LD | c(Rn), A | ; Load each vector component of A with the<br>; value in DM pointed to by the address<br>; formed by the sum of register R[n] + c. |
| LD | c(Rn), An | ; Load the nth component of A with the<br>; value in DM pointed to by the address<br>; formed by the sum of register R[n] + c. |
| LD | #number, A | ; Load each vector component A with the<br>; same value number. |
| LD | #number, A.n | ; Load the nth component of A with the<br>; value number. |
| ST | A.n, addr | ; Store the nth component of vector A in<br>; DM[addr]. |
| ST | A.n, (Rn) | ; Store the nth component of A in the DM<br>; location pointed to by register R[n]. |
| ST | A.n, c(Rn) | ; Store the nth component of A in the DM<br>; location pointed to by the address<br>; formed by the sum of register R[n] + c. |
| MOV | A.n, B.n | ; Move the nth component of A to the nth<br>; component of B. |

APPENDIX B-4

| | | |
|---|---|---|
| MOV | A.i, B.j | ; Move the ith component of A to the jth<br>; component of B ( A and B can be the same<br>; register) |
| MOV | A.j, B.i | ; Move the jth component of A to the ith<br>; component of B (A and B can be the same<br>; register) |
| MOV | A.j, B.k | ; Move the jth component of A to the kth<br>; component of B (A and B can be the same<br>; register) |
| MOV | A.k, B.i | ; Move the kth component of A to the ith<br>; component of B (A and B can be the same<br>; register) |
| MOV | A.k, B.j | ; Move the kth component of A to the jth<br>; component of B (A and B can be the same<br>; register) |
| MOV | A, B | ; Move Vector A into Vector B |

CORDIC operations

R64 and R65 (Cout0 and Cout1) are the two vector registers where the output of the CORDIC chips are placed. They can be read just like any other vector register, but only as a complete vector.

| | | |
|---|---|---|
| VEC0 | A, B | ; Vector Operation with CORDIC chip 0 |
| ROC0 | A, B | ; Rotate Operation with CORDIC chip 0 |
| VEC1 | A, B | ; Vector Operation with CORDIC chip 1 |
| ROC1 | A, B | ; Rotate Operation with CORDIC chip 1 |

BRANCH OPERATIONS

| | | |
|---|---|---|
| JMP | ea | ; Jump to address specified by ea. |
| JNZn | ea | ; Jump if zero flag bit for nth component<br>; is not set. |
| JZn | ea | ; Jump if zero flag bit for nth component<br>; is set. |
| JPn | ea | ; Jump if positive flag bit for nth<br>; component is positive |
| JNn | ea | ; Jump if negative flag bit for nth<br>; component is negative |
| JVZ | ea | ; Jump if all three zero bits are set. |
| JVNZ | ea | ; Jump if any of the three zero bits are not<br>; set |
| JOVV | ea | ; Jump if any of the three overflow bits are<br>; set |
| JNOVV | ea | |
| JOVn | ea | ; Jump if the nth overflow bit is set |
| JNOVn | ea | |
| JCn | ea | ; Jump if the nth carry bit is set. |
| JNCn | ea | ; |

APPENDIX B-5

| | | |
|---|---|---|
| JSR | ea | ; Jump to subroutine. Save the current PC<br>; in the R63i register. None of the status<br>; or registers are saved. |
| RTS | – | ; Return from subroutine. Load the contents<br>; of R63.i into the PC. |
| RTI | | ; Return from interrupt. Load the contents<br>; of R63.k into the PC. |

LOGICAL OPERATIONS

| | | |
|---|---|---|
| AND | A.n, B.n, C.n | ; C[n] = A[n] AND B[n] |
| AND | A.i, B.j, C.i | ; C[i] = A[i] AND B[j] |
| AND | A.i, B.j, C.j | ; C[j] = A[i] AND B[j] |
| AND | A.j, B.k, C.k | ; C[k] = A[j] AND B[k] |
| AND | A.j, B.k, C.i | ; C[i] = A[j] AND B[k] |
| AND | A.j, B.k, C.j | ; C[j] = A[j] AND B[k] |
| | | |
| OR | A.n, B.n, C.n | ; C[n] = A[n] OR B[n] |
| OR | A.i, B.j, C.i | ; C[i] = A[i] OR B[j] |
| OR | A.i, B.j, C.j | ; C[j] = A[i] OR B[j] |
| OR | A.j, B.k, C.k | ; C[k] = A[j] OR B[k] |
| OR | A.j, B.k, C.i | ; C[i] = A[j] OR B[k] |
| OR | A.j, B.k, C.j | ; C[j] = A[j] OR B[k] |
| | | |
| XOR | A.n, B.n, C.n | ; C[n] = A[n] XOR B[n] |
| XOR | A.i, B.j, C.i | ; C[i] = A[i] XOR B[j] |
| XOR | A.i, B.j, C.j | ; C[j] = A[i] XOR B[j] |
| XOR | A.j, B.k, C.k | ; C[k] = A[j] XOR B[k] |
| XOR | A.j, B.k, C.i | ; C[i] = A[j] XOR B[k] |
| XOR | A.j, B.k, C.j | ; C[j] = A[j] XOR B[k] |
| | | |
| NOT | A.n, B.n | ; B[n] = NOT A[n] |

SHIFT AND ROTATE REGISTER OPERATIONS

| | | |
|---|---|---|
| RTC | A, B | ; rotates the components of vector A right<br>; by one component. i -> j, j -> k, k -> i<br>; and store in B. |
| SHFL | #number, A.n, B.n | ; shift A[n] left #number bits and store in B[n] |
| SHFR | #number, A.n, B.n | ; shift A[n] right #number bits and put in B[n] |
| ROR | #number, A.n, B.n | ; rotate A[n] right #number bits and put in B[n] |
| ROL | #number, A.n, B.n | ; rotate A[n] left #number bits and store in B[n]. |

OTHERS

| | | |
|---|---|---|
| SLZ | A, B | ; Set Leading Zeroes in each vector<br>; component of A and store number of<br>; leading zeroes in respective components |

APPENDIX B-6

```
                              ; of vector B. Status Registers SR<7..0> are
                              ; also stored with the numbers of leading
                              ; zeros.
   SLZ    A.n, B.n            ; Set Leading Zeroes, count the number
                              ; of leading zeroes in A[n] and store this
                              ; number in B[n]. SR also contains number.
   SLZ    A.i, B.j            ; SR[i] is set.
   SLZ    A.j, B.k            ; SR[j] is set.
   SLZ    A.k, B.i            ; SR[k] is set.
   SLZ    A.k, B.j            ; SR[k] is set.
   SLZ    A.j, B.i            ; SR[i] is set, (yes, i).

ALN    A, B                ; Align vector.
   ALN    A.n, B.n            ; Align, shift left (rotate) A[n] by the
                              ; positive (negative) number in the Status
                              ; Status Register SR[n] and store in B[n].
   ALN    A.i,B.j             ; Uses SR[i].
   ALN    A.j,B.k             ; Uses SR[j].
   ALN    A.k,B.i             ; Uses SR[k].
   ALN    A.k,B.j             ; Uses SR[k].
   ALN    A.j,B.i             ; Uses SR[i].

LALN   A, B, C             ; Long Align, vector A is MSW.
   LALN   A.n, B.n, C.n       ; Long align, concatenate A[n] and B[n] and
                              ; rotate by amount specified in Status
                              ; Register SR[n]<7..0> and place 32 MSBits
                              ; in C[n]. Note A[n] is MSW.
   LALN   A.i,B.j,C.i         ; Uses SR[i].
   LALN   A.i,B.j,C.j         ; Uses SR[i].
   LALN   A.j,B.k,C.k         ; Uses SR[k].
   LALN   A.j,B.k,C.i         ; Uses SR[k].
   LALN   A.j,B.k,C.j         ; Uses SR[k].

STSR   A                   ; Store SR into vector A.
   STSRn  A.n                 ; Store SR[n] into A[n]
   STSRi  A.j                 ;
   STSRj  A.k                 ;
   STSRk  A.j                 ;
   STSRk  A.i                 ;

LDSR   A                   ; Load SR from vector A.
   LDSRn  A.n                 ; Load SR[n] from A[n].
   LDSRi  A.j                 ;
   LDSRk  A.j                 ;

STP    A                   ; Store lower 32-bits of product (vector)
   STPi   A.i                 ; Scalar store product
   STPi   A.j                 ;
   STPj   A.j                 ;
   STPj   A.k                 ;
   STPk   A.i                 ;
   STPk   A.j                 ;
```

APPENDIX B-7

```
STPk     A.k           ;
STPij    A.ij          ;
STPjk    A.jk          ;

SUBVR    A, B, C       ; Subtract vector followed by RTC
MULVR    A, B, C       ; Multiply vector followed by RTC
OVRST                  ; Reset all three overflow flag bits.
UDRST                  ; Reset the update latch.
DUDI                   ; Disable UpDate Interrupt
EUDI                   ; Enable UpDate Interrupt
NOP                    ; No Operation
```

Addressing Modes

All functional instructions (and moves) may only use "register direct addressing" (the contents of the register specified are used as the operand).

The following addressing capabilities are only offered for the nonfunctional instructions - Load, Store and Jump. The places which allow these types of addressing are indicated by "ea" (effective address).

$R_n^*$ - register direct - the contents of the register specified is used as the operand. n is included in the opcode and indicates which vector component is to be used - i, j or k.

$(R_n)$ - register indirect - the data memory address of the operand is in the register indicated.

$c(R_n)$ - register indirect plus offset - the data memory address of the operand is the sum of the base register - $R_n$, plus the offset - c. The offset is given in the constant field of the instruction.

abs - absolute - the data memory address of the operand is given by the constant field of the instruction.

- immediate - the operand is given in the constant field of the instruction.

Register Labels

The registers designation A, B, C, and D designiate any one of 64 vector registers with exception of the two CORDIC output registers (mentioned with CORDIC instructions). Those with suffix i, j or k correspond to the ith, jth, or kth component of the given vector register. Those with suffix ij and jk pertain to the two components of the vector register. Those without any suffix at all refer to the entire vector register.

APPENDIX C

Schematic #1

| 1 | 2 |
|---|---|
| 3 | 4 |

Schematic #2

| 1 | 2 | 3 |
|---|---|---|
| 4 | 5 | 6 |

Schematic #3

| 1 | 2 | 3 | 4 |
|---|---|---|---|
| 5 | 6 | 7 | 8 |

APPENDIX C
Schematic # 1
1 of 4
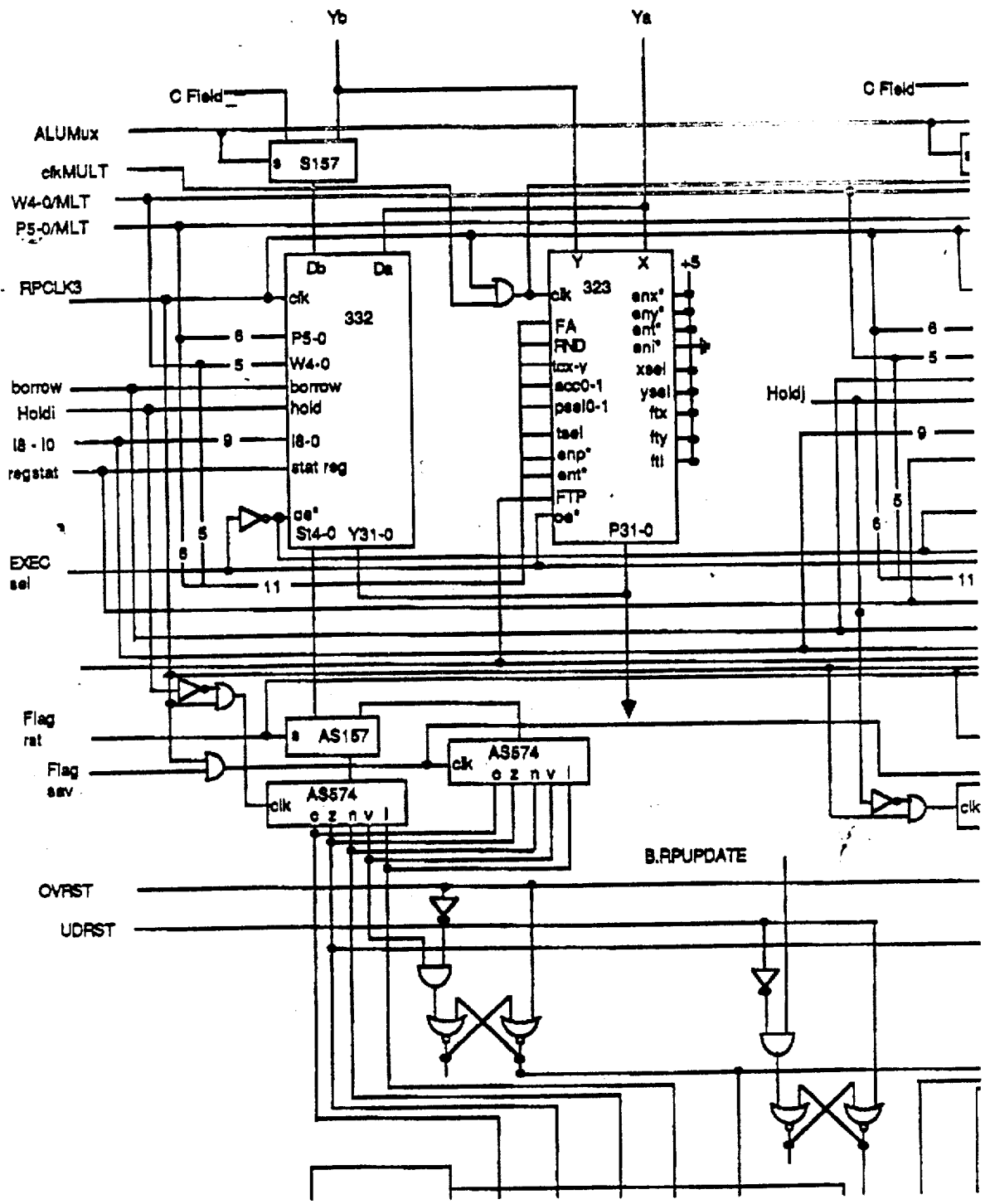

APPENDIX C
Schematic # 1
2 of 4
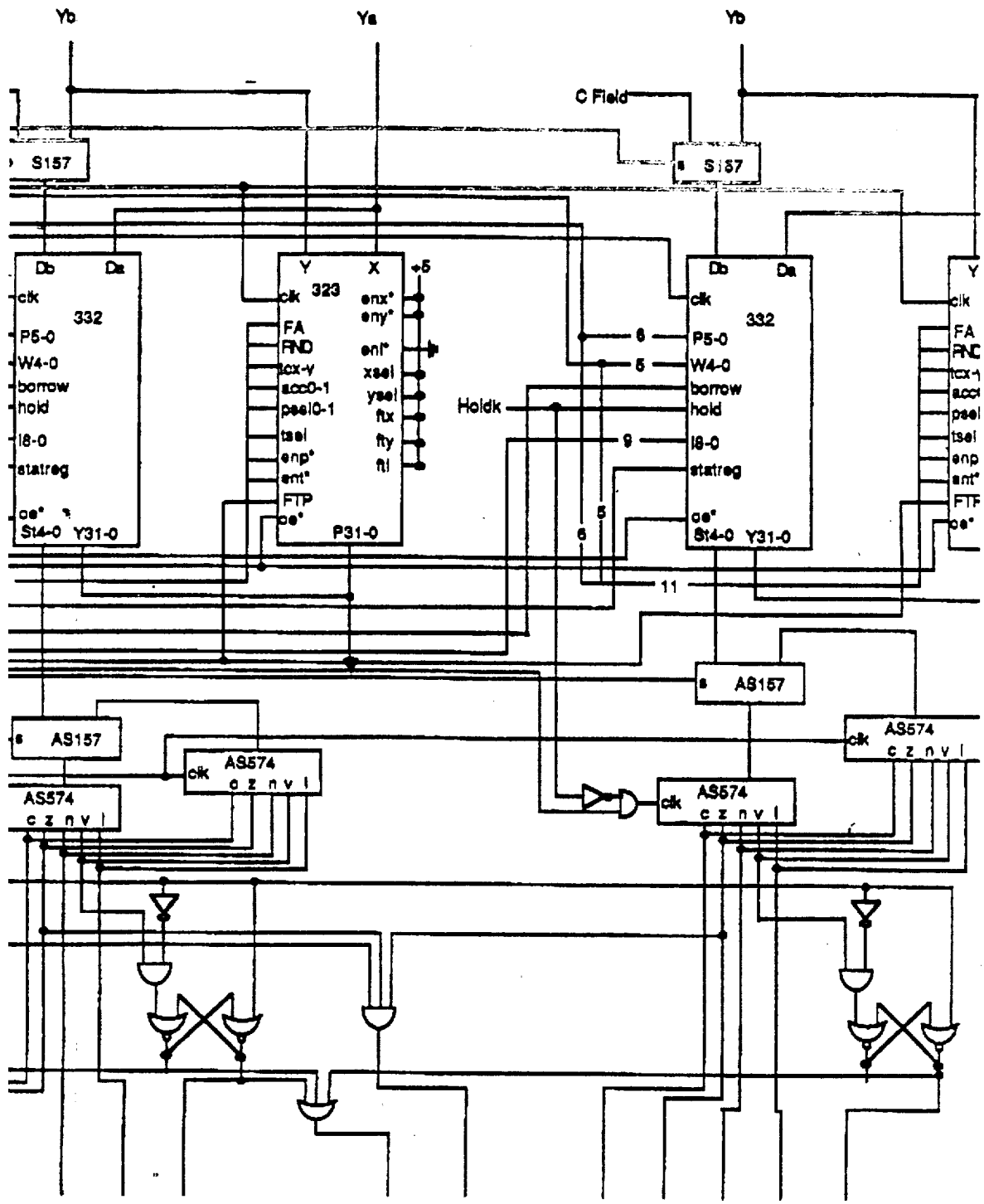

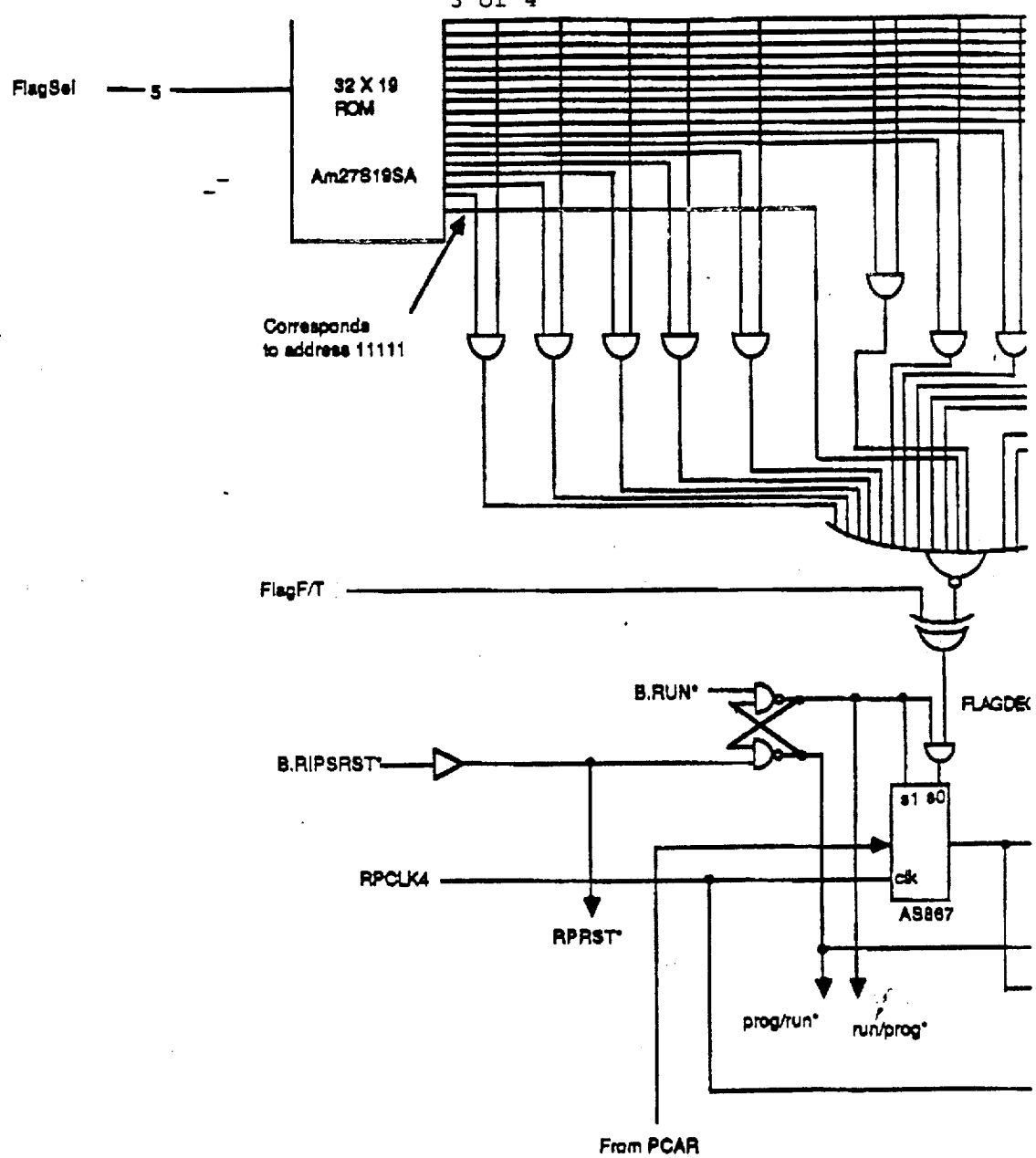

APPENDIX C
Schematic # 1
4 of 4
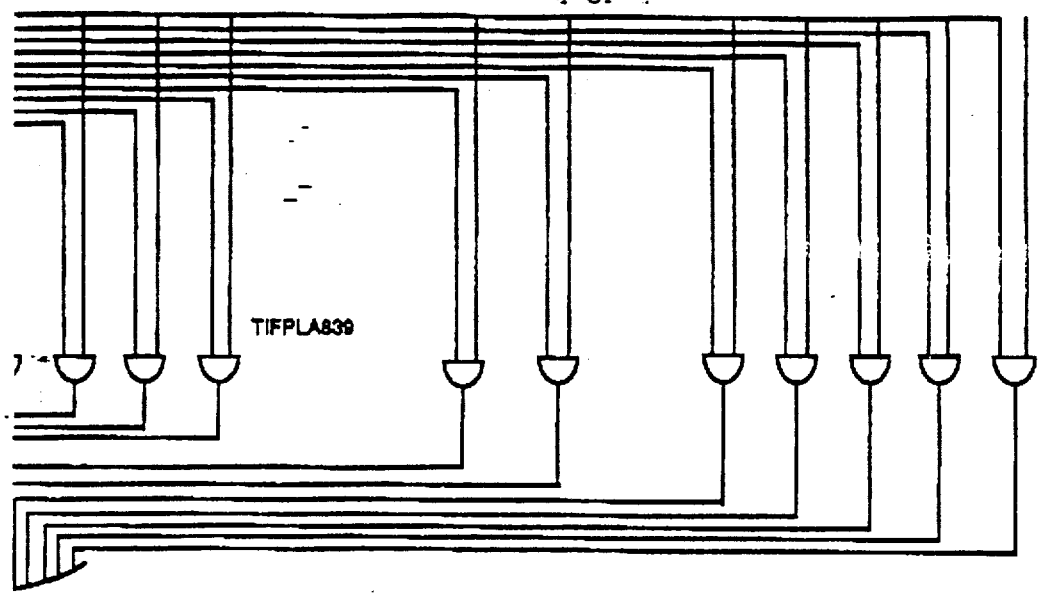
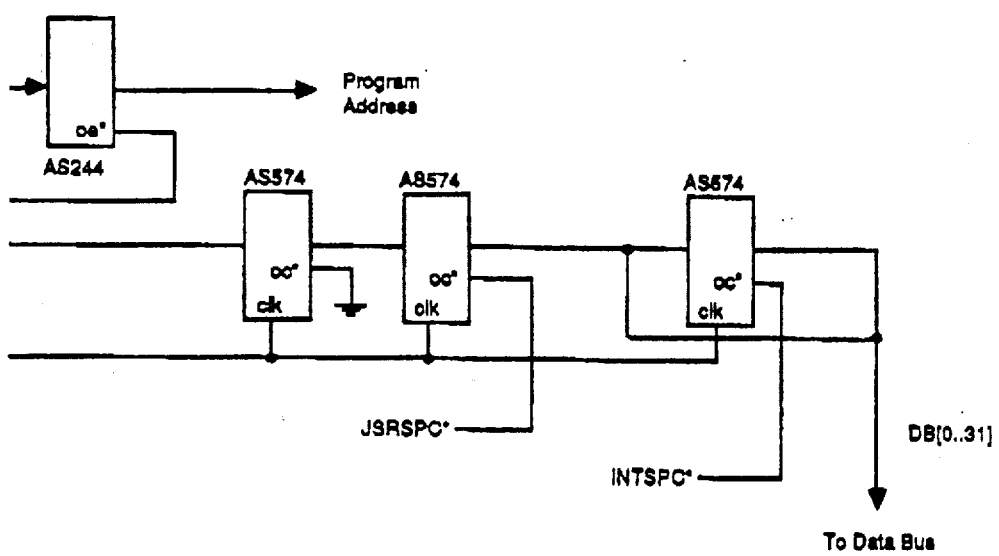

APPENDIX C
Schematic # 2
1 of 6
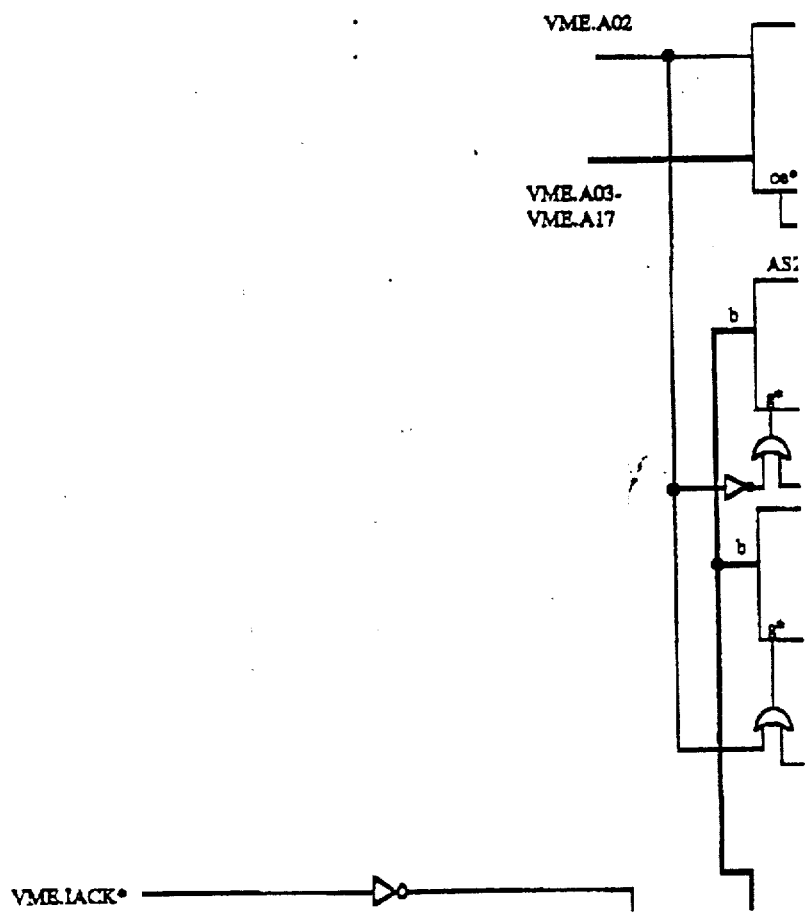

APPENDIX C
Schematic # 2
2 of 6
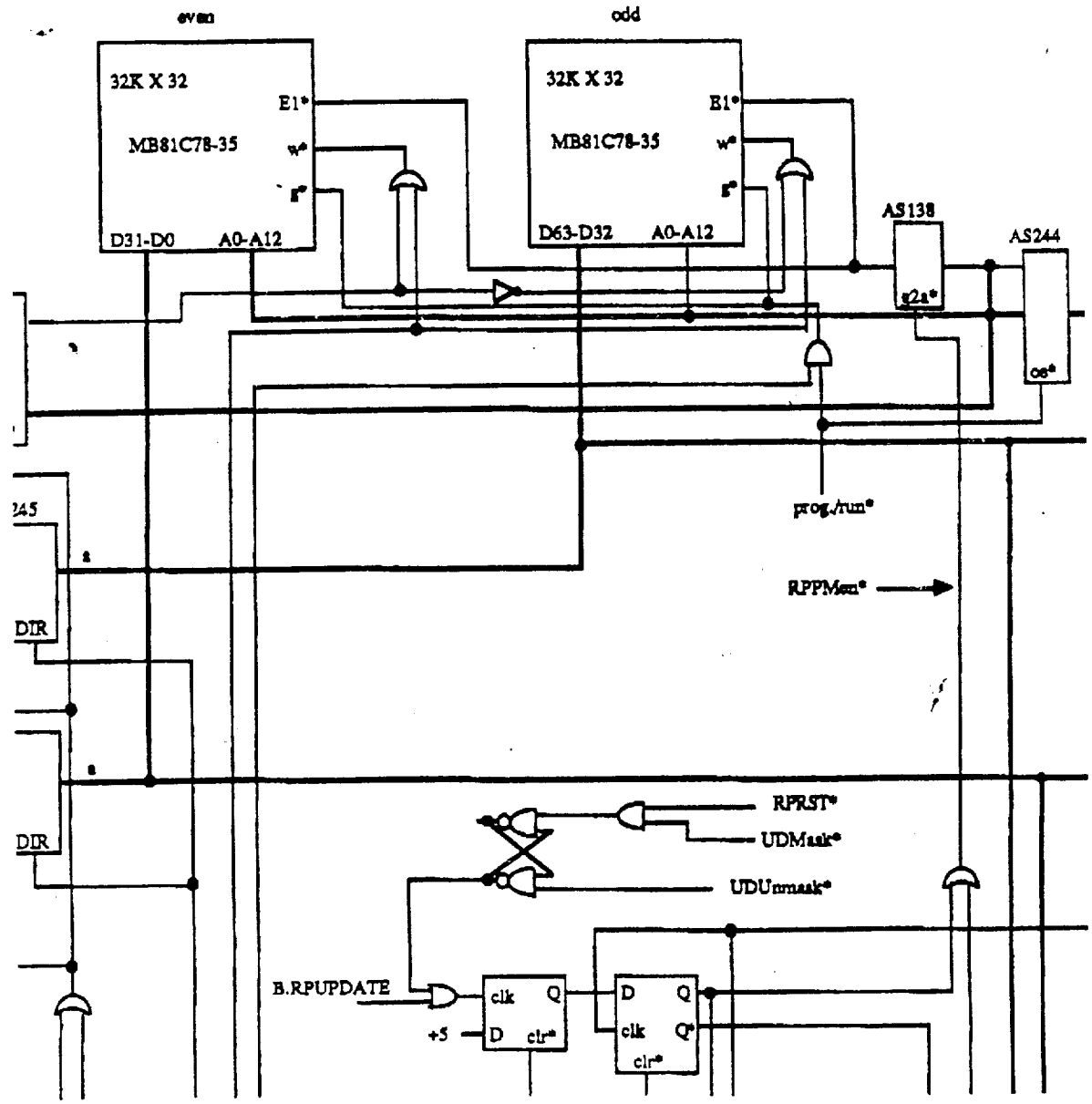

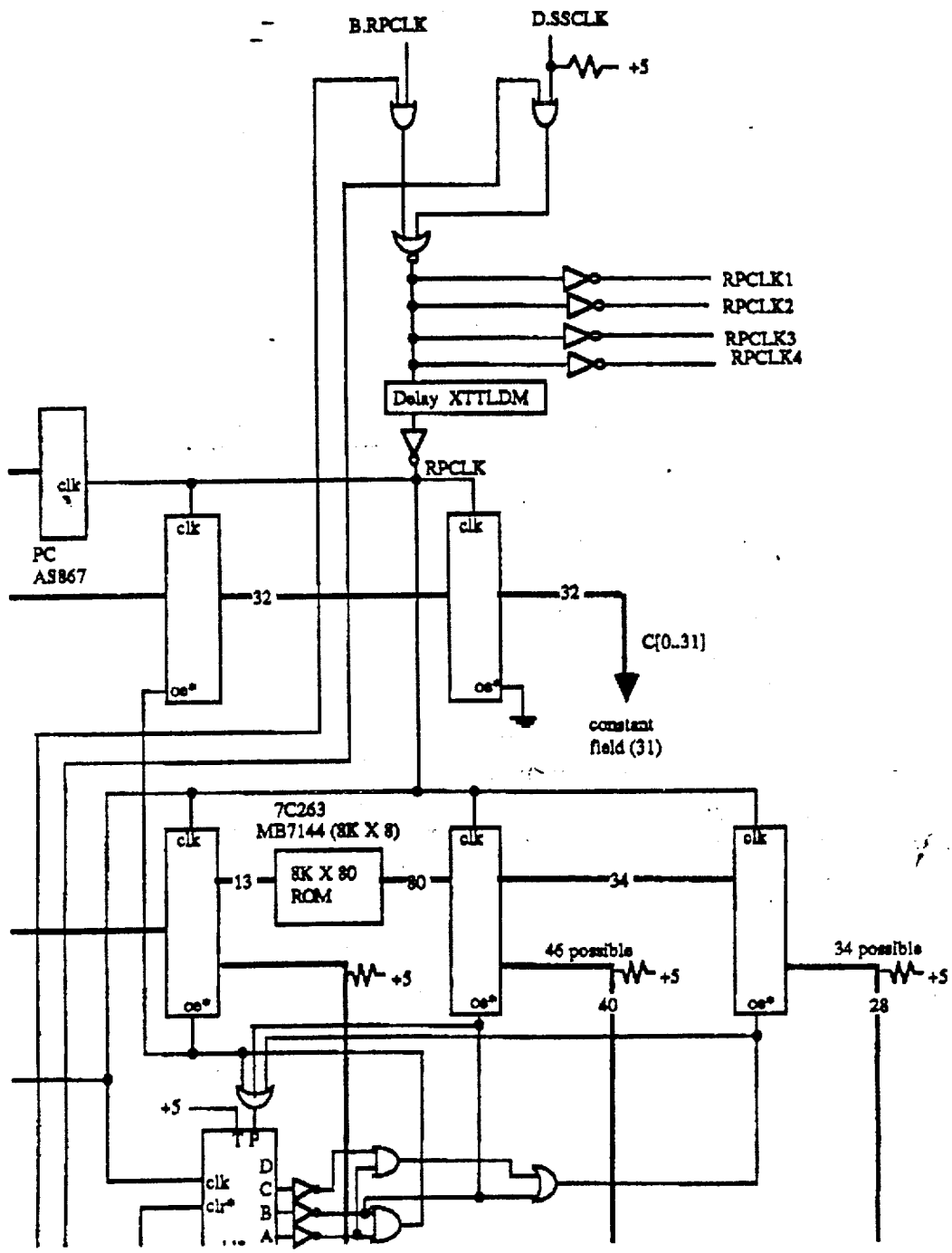

APPENDIX C
Schematic # 2
4 of 6
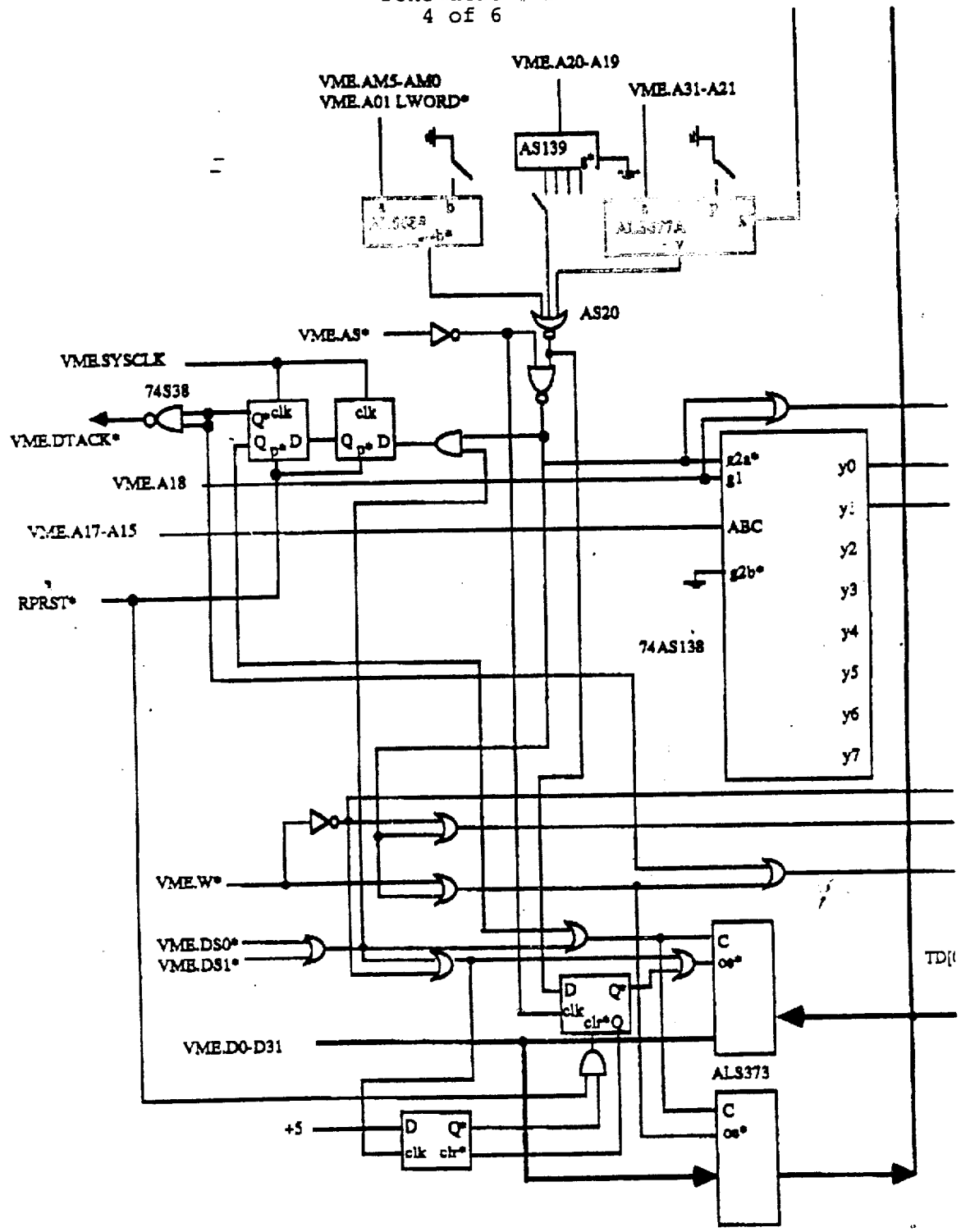

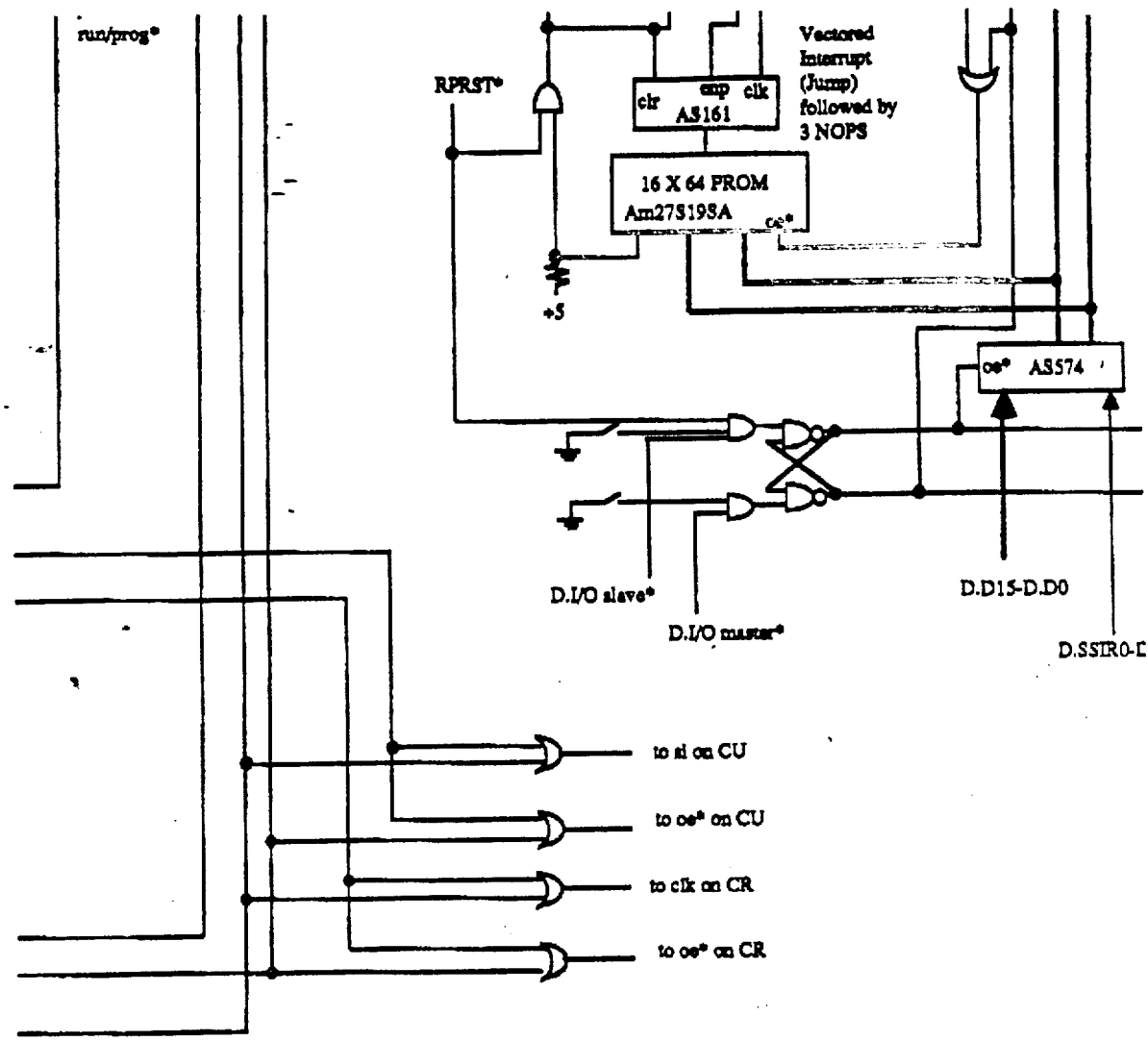

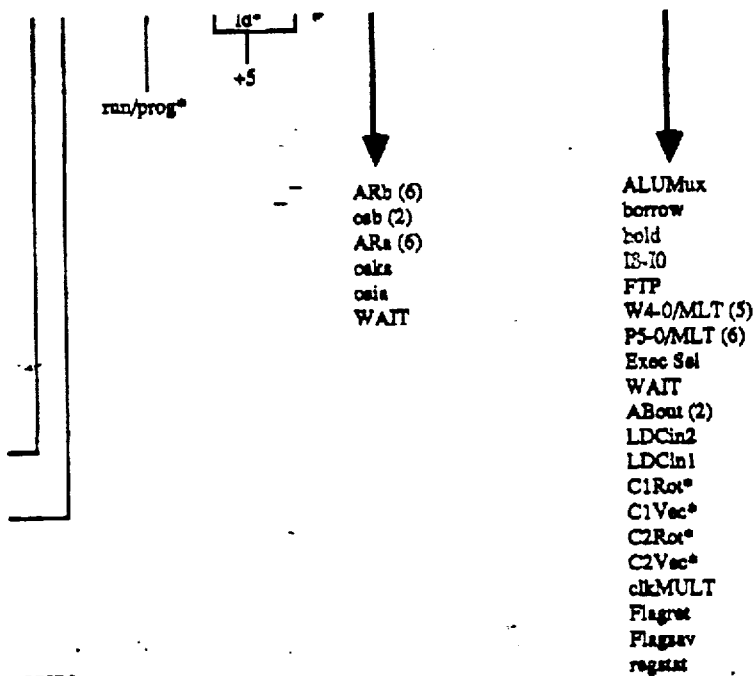
APPENDIX C
Schematic # 2
6 of 6

APPENDIX C
Schematic # 3
1 of 8
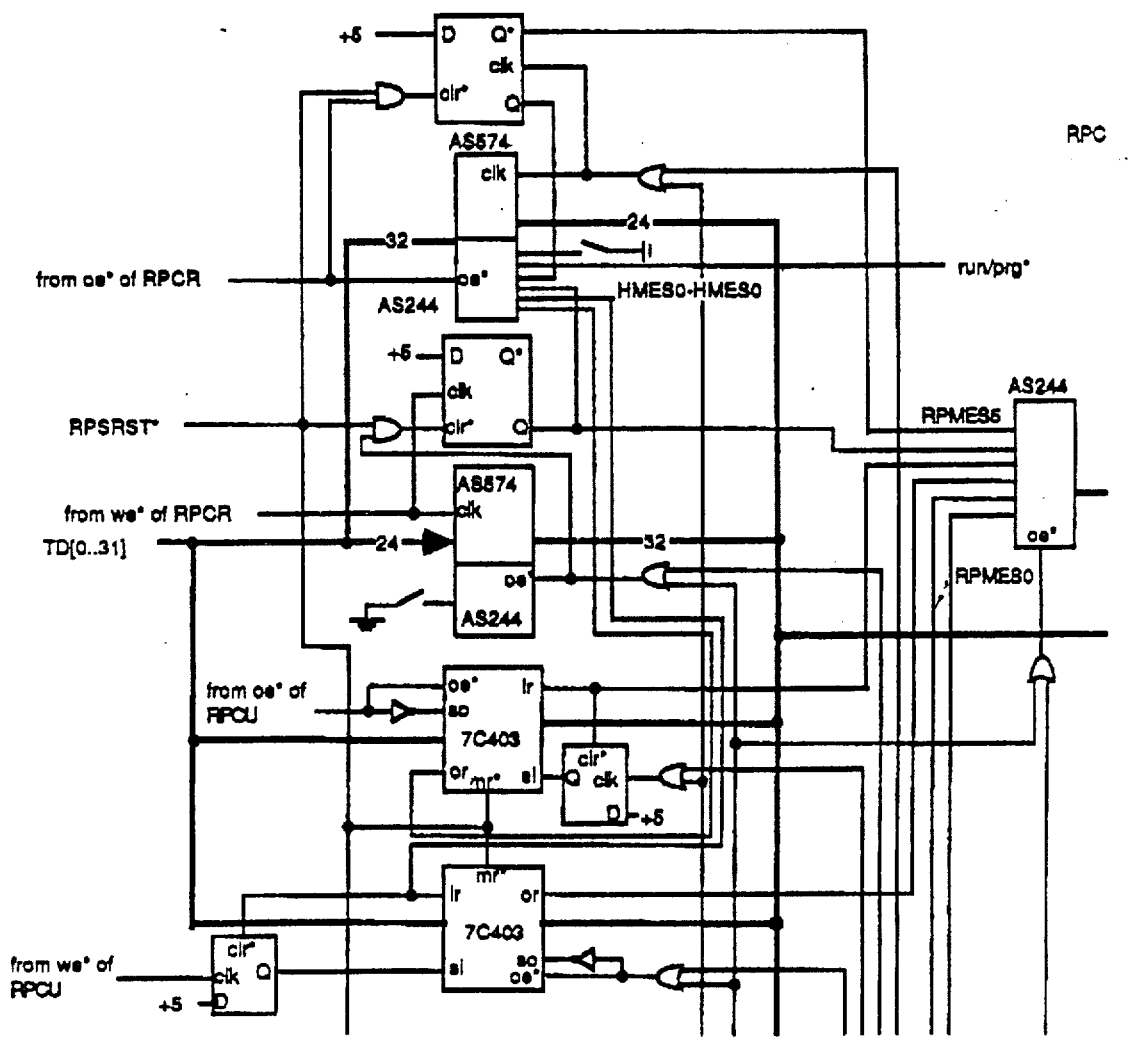

APPENDIX C
Schematic # 3
2 of 8
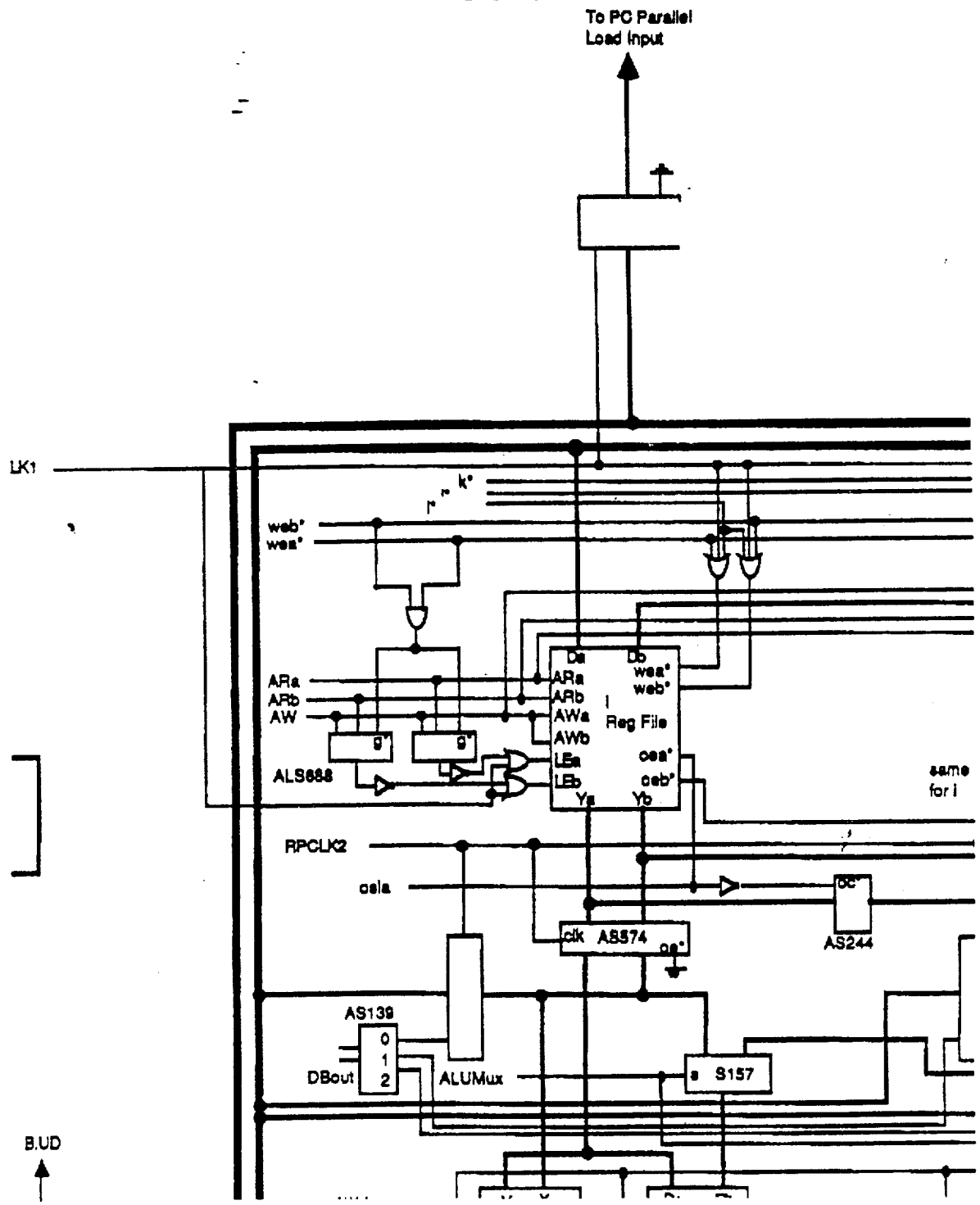

APPENDIX C
Schematic # 3
3 of 8
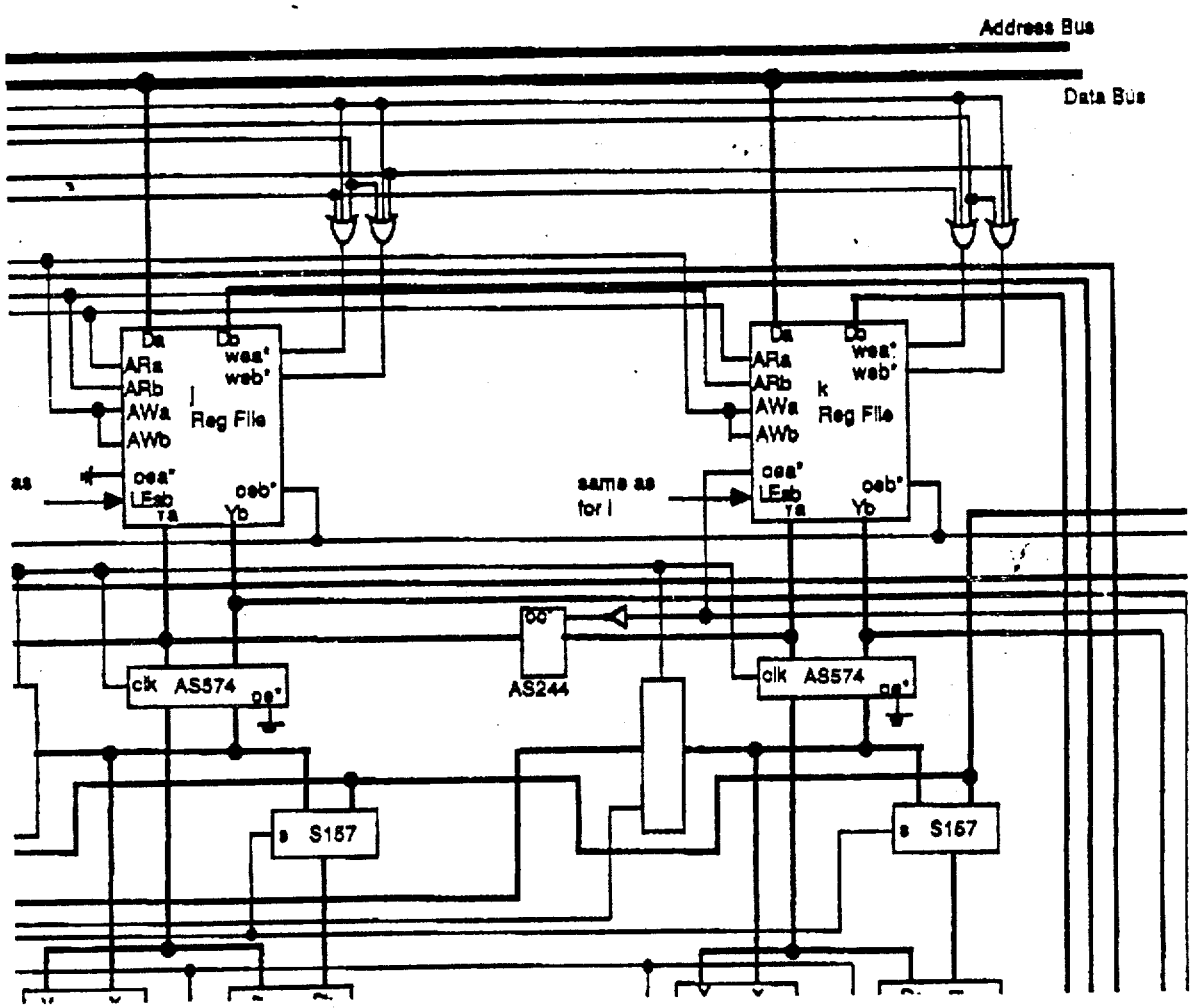

APPENDIX C
Schematic # 3
4 of 8
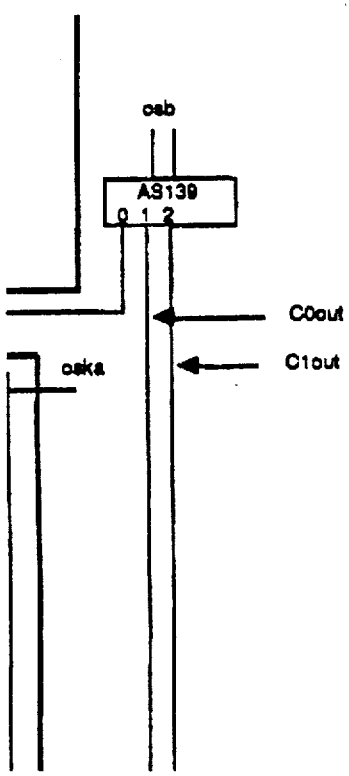

APPENDIX C
Schematic # 3
5 of 8
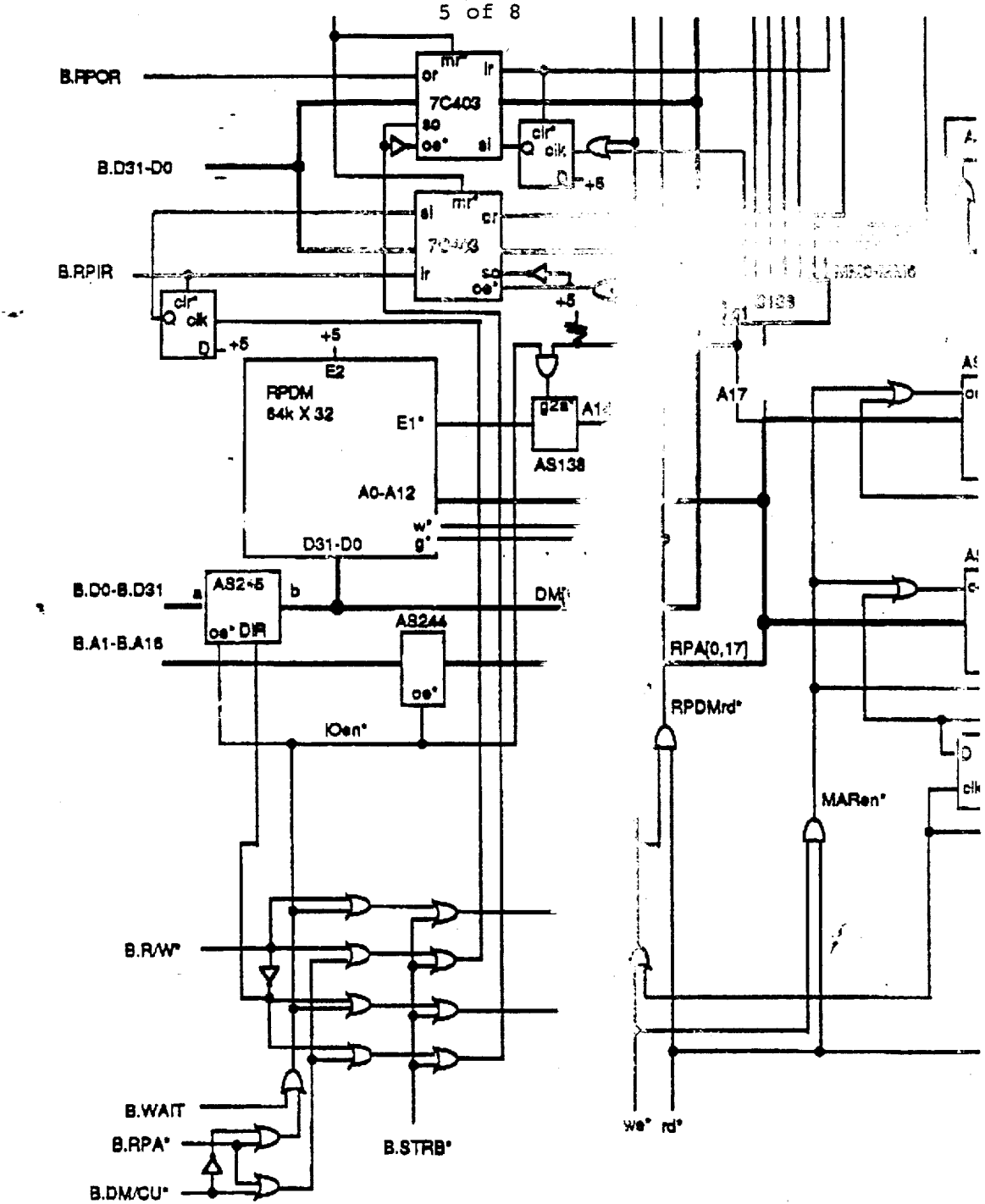

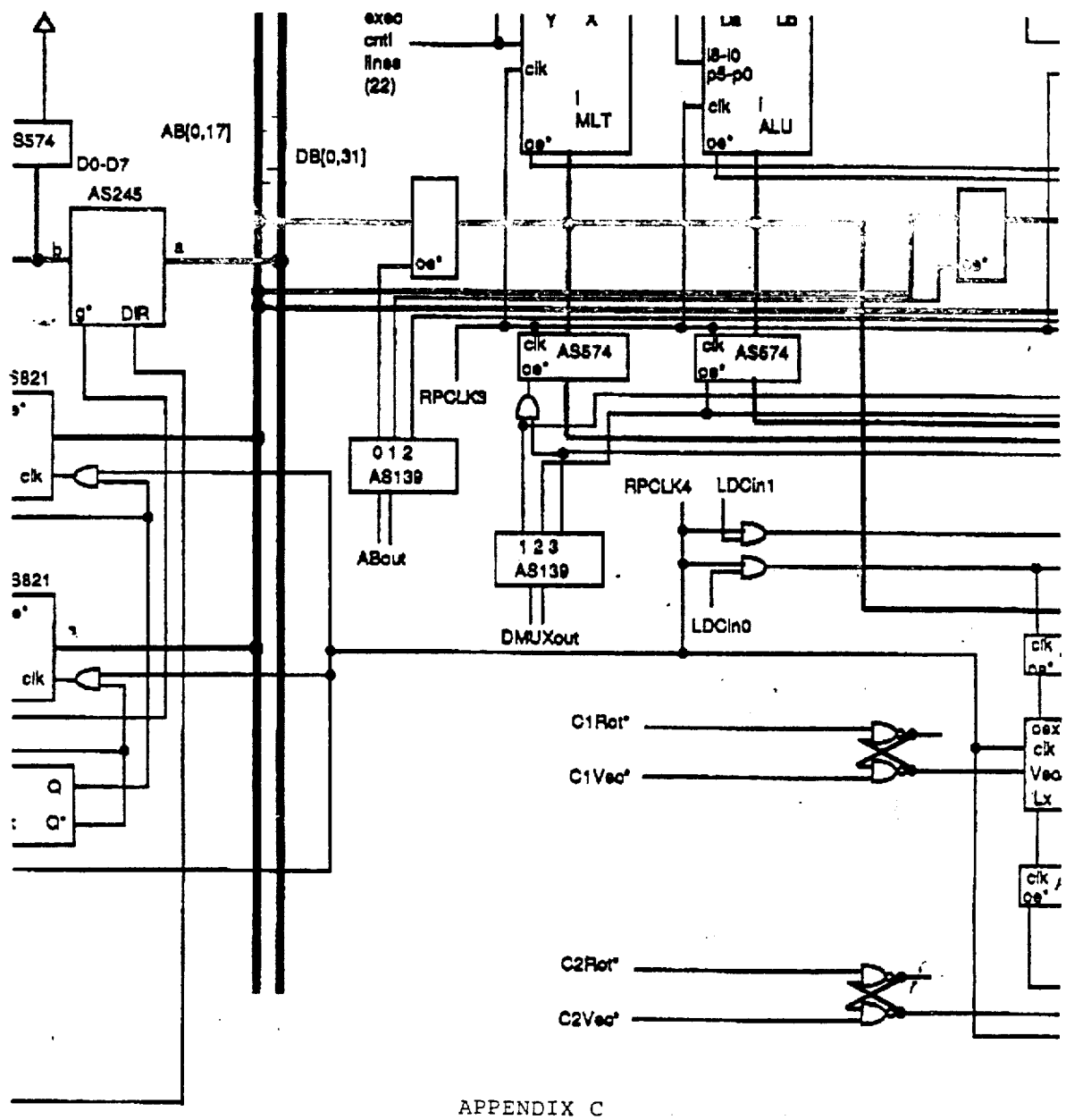
APPENDIX C
Schematic # 3
6 of 8

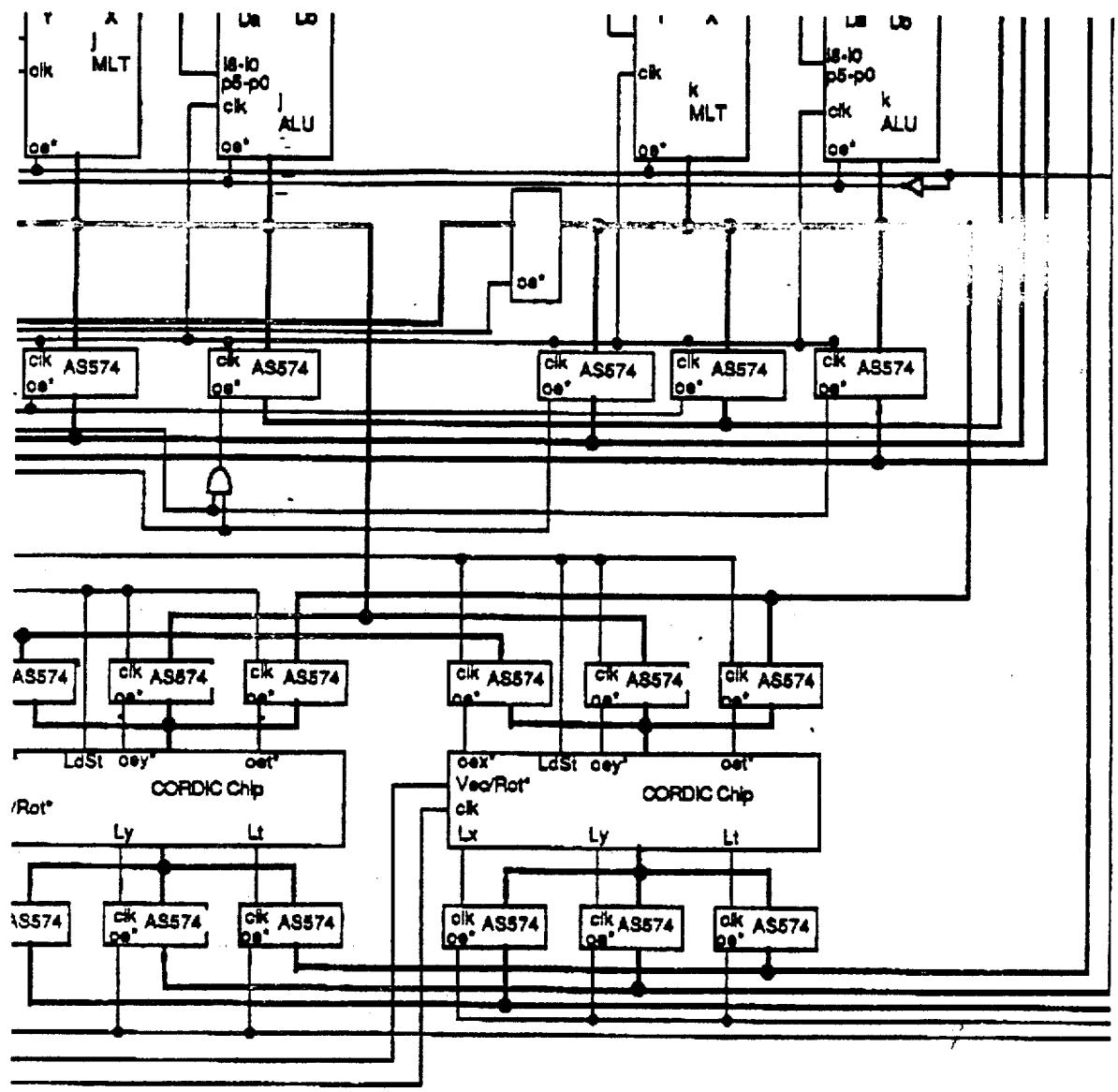
APPENDIX C
Schematic # 3

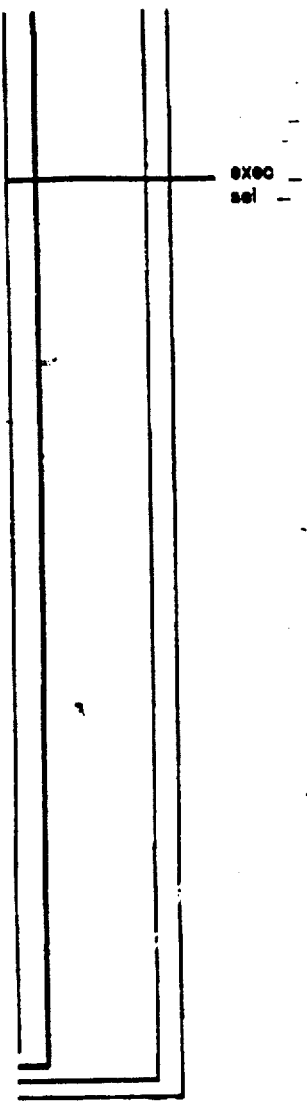

APPENDIX C
Schematic # 3
8 of 8

It is claimed:

1. A processor for receiving and executing a series of program instructions and data provided from a memory, for carrying out vector/vector and scalar/vector arithmetic operations, comprising:
   a. a data transfer input means for receiving the series of program instructions and data from memory;
   b. I, J, and K register files coupled to said data transfer input mans for receiving operands therefrom, each containing a plurality of registers for storing scalar values for the components of a plurality of three-dimensional vectors;
   c. I, J, and K execution units coupled to said I, J, and K register files for performing arithmetic operations on operands placed in the execution units;
   d. I, J, and K operand pathways connecting each I, J, and K register file, respectively, with the corresponding I, J, and K execution units, for transferring operands stored in selected register locations to the corresponding execution units, in response to data-fetch commands carried in the program instructions, each said I, J, and K operand pathways including a first and second data bus;
   e. first and second broadcast buffer connecting I and J operand pathways and J and K operand pathways, respectively, for passing operands between each pair of the operand pathways, in response to pathway exchange commands carried in the program instructions;
   f. data-return means coupled to said I, J, and K execution units and said I, J, and K register files for returning operands from the execution units to selected locations in the register files, in response to write-to-register commands in the program instructions;
   g. data-transfer output means having its inputs coupled to the outputs of said I, J and K execution units and further having its outputs coupled to the memory for passing selected operands from the processor to the memory, in response to write-to-memory commands carried in the program instructions; and,
   h. a program evaluation unit coupled to said I, J, and K register files and to said data transfer input means for passing commands in the program instructions to the register files, the execution units, the broadcast buffers, the data-return means, and the data-transfer input means and output means.

2. The processor of claim 1, wherein each of the I, J, and K execution units includes an arithmetic logic unit and a multiplication unit.

3. The processor of claim 2, wherein each operand pathway includes a first and second latch connecting said first and second bus, respectively, for storing operands sent from the I, J, and K register files, a third data bus connecting the first latch with a corresponding arithmetic logic unit and multiplication unit, and a fourth data bus connecting the second latch with the multiplication unit.

4. The processor of claim 3, which further includes, for each of the I, J, and K execution units, multiplexing means for directing either the operands stored in the second latch or a constant value from the program evaluation unit to the corresponding arithmetic logic unit, in response to commands in the program instructions.

5. The processor of claim 4, wherein said multiplexing means includes a third latch for staging the contents of said second latch and transferring the contents of said third latch to the memory.

6. The processor of claim 1, wherein the data return means includes a multiplexing means associated with each of the operand pathways in the processor for writing the results of the execution units into selected register files locations, said multiplexing means having its inputs coupled to the I, J and K executions units, said multiplexing means having its outputs coupled to the data return means.

7. The processor of claim 1, which further includes a CORDIC unit which implements two-dimensional coordinate rotations, using operands obtained from the three register files, and said shift-and-add unit includes latches for storing the output values of the algorithm operation, for use as operands in subsequent program instructions.

8. The processor of claim 1, wherein the program instructions are pipelines from the program evaluation unit in fetch-operand, execute, and store-result stages.

9. The processor of claim 8, wherein the processor clock speed in less than 100 nsec.

10. A process for processing a series of program instructions and data for carrying out vector/vector and scalar/vector arithmetic operations, comprising:
   a. a memory for storing the program instructions and data and for storing the results of arithmetic operations performed in accordance with the program instructions;
   b. a data transfer input means for receiving the series of program instructions and data from the memory;
   c. I, J, and K register files coupled to said data transfer input means of receiving operands therefrom, each containing a plurality of registers for storing scalar values for the components of a plurality of three-dimensional vectors;
   d. I, J, and K execution units coupled to said I, J, and K register files for performing arithmetic operations on operands placed in the execution units;
   e. I, J, and K operand pathways connecting each I, J, and K register file, respectively, with the corresponding I, J, and K execution units, for transferring operands stored in selected register locations to the corresponding execution units, in response to data-fetch commands carried in the program instructions, each said I, J, and K operand pathways including a first and second data bus;
   f. first and second broadcast buffers connecting I and J operand pathways and J and K operand pathways, respectively, for passing operands between each pair of the operand pathways, in response to pathway exchange commands carried in the program instructions;
   g. data-return means coupled to said I, J, and K execution units and said I, J, and K register files for returning operands from the execution units to selected locations in the register files, in response to wire-to-register commands in the program instructions;
   h. data-transfer output means having its inputs coupled to the outputs of said I, J and K execution units and further having its outputs coupled to the memory for passing selected operands from the processor to the memory, in response to write-to-memory commands carried in the program instructions; and,
   i. a program evaluation unit coupled to said I, J, and K register files and to said data transfer input means for passing commands in the program instructions to the register files, the execution units, the broadcast buffers, the data-return means, and the data-transfer input means and output means.

11. The processor of claim 10, wherein the memory includes a program memory for storing program instructions, and a data memory for storing operands needed for program execution.

12. The processor of claim 10, for use in a robotics control device for calculating kinematic and dynamic solutions needed to control robotic motion.

13. The processor of claim 12, wherein the calculations involve performing vector cross product, vector addition, scalar/vector multiplication, and scalar addition calculations.

14. The processor of claim 13, wherein the calculations further include vector rotation and trigonometric function calculations, and the processor further includes a CORDIC algorithm successive-add unit which implements two-dimensional coordinate rotations, using operands obtained from the three register files, and said successive-add unit includes latches for storing the output values of the algorithm operation for use in subsequent program instructions.

* * * * *

UNITED STATES PATENT AND TRADEMARK OFFICE
CERTIFICATE OF CORRECTION

PATENT NO. : 5,019,968

DATED : 5/28/91

INVENTOR(S) : Wang et al

It is certified that error appears in the above-identified patent and that said Letters Patent is hereby corrected as shown below:

Col. 4, line 62, after "for" delete ",".

Col. 5, line 31, delete "Sytem" insert --System--.

Col. 6, line 59, delete "d" insert --determining--.

Col. 6, line 60, after "FIG. 2" insert --is a--.

Col. 6, line 66, after "register" insert --files--.

Col. 7, line 10, after "FIG. 9" insert --is a--.

Col. 7, line 21, delete "involve" insert --involved--.

Col. 12, line 50-51, delete "Matrixvector" insert --Matrix-vector--.

Col. 13, line, delete "$A_{1,i} + A_{1,k} \rightarrow C_i$" insert --$A_{1,j} + A_{1,k} \rightarrow C_i$--.

Col. 19, line 43, delete "$(y1 +/x_1 * 2^{-(i-1)})$" insert --$(y_1 +/- x_1 * 2^{-(i-1)})$--.

UNITED STATES PATENT AND TRADEMARK OFFICE
CERTIFICATE OF CORRECTION

PATENT NO. : 5,019,968

DATED : 5/28/91

INVENTOR(S) : Wang et al

It is certified that error appears in the above-identified patent and that said Letters Patent is hereby corrected as shown below:

Col. 19, line 51, delete "$k_i(x_1 + delta_i$" insert --$k_i x_i - delta_i$--.

Col. 20, line 10, delete "$x_1 - delta_i$" insert --$(x_i - delta_i$--.

Col. 20, line 13, delete "$(x_n, y_n)$" insert --$x_n, y_n$--.

Col. 20, line 28, delete "$x_1 - delta_i$" insert ($x_i - delta_i$--.

Col. 20, line 66, delete "$delta_1$" insert --$delta_i$--.

Col. 83, line 52, delete "mans" insert --means--.

Col. 85, line 24, delete "files" insert --file--.

Col. 85, line 36, delete "pipelines" insert --pipelined--.

Col. 85, line 39, delete "in" insert --is--.

Col. 85, line 40, delete "process" insert --processor--.

Col. 85, line 50, delete "of" insert --for--.

UNITED STATES PATENT AND TRADEMARK OFFICE
CERTIFICATE OF CORRECTION

PATENT NO. : 5,019,968

DATED : 5/28/91

INVENTOR(S) : Wang et al

It is certified that error appears in the above-identified patent and that said Letters Patent is hereby corrected as shown below:

Col. 86, line 20, delete "wire-to-register" insert --write-to-register--.

Signed and Sealed this

Thirtieth Day of March, 1993

*Attest:*

STEPHEN G. KUNIN

*Attesting Officer*     *Acting Commissioner of Patents and Trademarks*